(12) United States Patent
Nakajima

(10) Patent No.: US 6,963,953 B2
(45) Date of Patent: Nov. 8, 2005

(54) CACHE DEVICE CONTROLLING A STATE OF A CORRESPONDING CACHE MEMORY ACCORDING TO A PREDETERMINED PROTOCOL

(75) Inventor: Masami Nakajima, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 219 days.

(21) Appl. No.: 10/214,230

(22) Filed: Aug. 8, 2002

(65) Prior Publication Data
US 2003/0110360 A1 Jun. 12, 2003

(30) Foreign Application Priority Data
Dec. 10, 2001 (JP) .............................. 2001-375378

(51) Int. Cl.$^7$ ............................................. G06F 12/08
(52) U.S. Cl. ....................... 711/129; 711/121; 711/124; 711/141
(58) Field of Search ........................ 711/121, 124, 129, 711/130, 141, 142, 143, 144, 145, 146, 153, 711/173

(56) References Cited

U.S. PATENT DOCUMENTS

| | | | |
|---|---|---|---|
| 5,140,681 A | * | 8/1992 | Uchiyama et al. .......... 711/134 |
| 5,394,555 A | * | 2/1995 | Hunter et al. ............... 711/148 |
| 6,449,699 B2 | * | 9/2002 | Franke et al. ............... 711/147 |
| 6,587,922 B2 | * | 7/2003 | Higuchi et al. ............. 711/121 |

FOREIGN PATENT DOCUMENTS

| | | | | |
|---|---|---|---|---|
| JP | 08202622 A | * | 8/1996 | ........... G06F 12/08 |
| JP | 2001-109662 | | 4/2001 | |

OTHER PUBLICATIONS

English language translation of JP 08202622 A to Agata.*
Takashi Matsumoto "*Fine Grain Support Mechanisms*" Calculator Architecture Research Report Meeting No. 77-12, Information Processing Society for Japan, Jul. 14, 1989, pp. 91-98.
Atsushi Moriwaki, et al, "*High-Performance Multiprocessor Workstation (TOP-1)*" Information Processing Society for Japan 38th Meeting Transaction, 1989, pp. 1456-1457.

* cited by examiner

Primary Examiner—Gary Portka
(74) Attorney, Agent, or Firm—McDermott Will & Emery LLP

(57) ABSTRACT

It assumes that "SO" represents a state, in which that data in a responsible region storing the data to be accessed most frequently by the corresponding processor is updated in a cache memory to be controlled by a cache device, and other data is stored in other cache memory. In this case, one or more cache devices controlling each of the remaining cache memories changes the state of the data in a region other than the responsible region of the cache memory controlled by itself from "SN" to "I" (invalid). Therefore, in the case where the data designated by the same address is shared by the plurality of cache memories, the data can be invalidated in the cache memories other than the cache memory corresponding to the processor including the designated address in its own responsible region. Therefore, a data sharing rate can be low.

15 Claims, 20 Drawing Sheets

LINE ADDRESS

···0000 → 0 1 0  — 10C
···0001 → 0 0 0  — 10A
···0010 → 1 1 0  — 10C
···0011 → 1 0 0  — 10A
···0100 → 0 1 1  — 10D
···0101 → 0 0 1  — 10B
···0110 → 1 1 1  — 10D
···0111 → 1 0 1  — 10B
···1000 → 0 1 0  — 10C
···1001 → 0 0 0  — 10A
···1010 → 1 1 0  — 10C
···1011 → 1 0 0  — 10A

CACHE DEVICE CONTROLLING A STATE OF A CORRESPONDING CACHE MEMORY ACCORDING TO A PREDETERMINED PROTOCOL

BACKGROUND OF THE INVENTION

1. Field of the Invention

The present invention relates to a device, which controls contents of a cache memory provided corresponding to each of processors of a multiprocessor system. In particular, the invention relates to a cache device controlling contents of a cache memory in accordance with a predetermined protocol.

2. Description of the Background Art

A multiprocessor system can execute intended processing at a high speed. More specifically, the intended processing is divided into a plurality of tasks, which can be executed in parallel, and each processor executes the task assigned thereto so that the processing proceeds in parallel. In this case, data communication is performed between the processors if data such as a variable is commonly used in tasks, which are executed by different processors, respectively. The above data, which is commonly used by the different processors (tasks) and is stored in a shared memory to be described later, is referred to as "shared data".

If data communication between the processors is frequently performed in the multiprocessor system, it is appropriate to perform the communication via a memory, which is shared by the processors, and will be referred to as a "shared memory" hereinafter. Among systems of coupling the shared memory and each processor, a shared bus system requires the most simple and inexpensive hardware structure. In this shared bus system, a bus for accessing the shared memory is shared by a plurality of processors. If confliction (which will be referred to as "bus confliction" hereinafter) in data communication on the shared bus does not occur, a cost of the access to the shared memory is low. However, increase in number of the processors causes the bus confliction, and therefore increases overhead of data communication. A snoop cache has been proposed as a method of significantly reducing the bus confliction, and is now practically employed in many multiprocessor systems.

In the multiprocessor system, traffic on the shared bus increases if each processor directly accesses the shared memory for accessing the shared data. Therefore, a private cache memory is provided for each processor so that shared data read from the shared memory is written (copied) into the cache memory, and the cache memory will be accessed instead of the common memory when the access to the shared data is requested thereafter. Thereby, the bus confliction described above can be suppressed.

In the multiprocessor, since contents of the shared memory of, e.g., a main memory device is copied onto a plurality of cache memories, inconsistency in contents occurs between the plurality of cache memories in addition to inconsistency between the main memory device and the cache memory, and therefore it is impossible to main cache coherence (i.e., coherence in shared data written into the cache memories). The snoop cache overcomes this problem by utilizing features of the shared bus. In the multiprocessor system utilizing the shared bus, since the data communication is performed via one shared bus, behavior of the system can be determined by monitoring the flow of data on the shared bus. According to the snoop cache, transactions on the shared bus for the cache memories are actively snooped, and predetermined processing for maintaining the cache coherence is performed for ensuring consistency in contents when a transaction affecting contents of the cache memory is detected. The manner of handling a series of data for ensuring the content consistency is referred to as a cache consistency protocol. The cache consistency protocol can be specifically classified depending on a time for achieving consistency in contents (the time of write through or the time of write back) as well as a manner (whether contents are to be invalidated or updated).

The cache consistency protocol, in which the contents become consistent at the time of write through, is referred to as a "write through cache". The write through cache is the simplest cache consistency protocol, in which each line (to be referred to as a "cache line" hereinafter) of the cache memory can attain only two states, i.e., a valid (V) state and an invalid (I) state. Therefore, only one bit is required for a tag (which will be referred to as a "state tag" hereinafter). According to the write through cache, the control can be simple, but traffic on the shared bus increases because the shared bus is utilized every time the data writing is performed. The cache line in the above description forms a unit of access performed by designating one time an address in the cache memory.

Then, description will now be given on a basic protocol of the write back cache, which is a cache consistency protocol classifies into a manner of invalidating the contents at the time of write back, and description will also be given on a Symmetry protocol, an Illinois protocol and a Berkeley protocol included in the write back cache.

First, the basic protocol will be described. According to the write back cache, a state tag of a cache line of a cache memory requires a bit representing a state of valid (V) or invalid (I), and additionally requires a bit representing a state of consistent (C: Clean) or inconsistent (D: Dirty) in contents of the cache line and the shared memory. Information relating to consistent/inconsistent has no meaning for the cache line in the invalid (I) state. Consequently, the state of the cache line selectively attains I (invalid), C (consistent with contents of shared memory) and D (inconsistent with contents of shared memory). The I (invalid) state of the cache line is a state, in which contents of the cache line are not ensured.

The Symmetry protocol will now be described. A variable used only in a certain program (task) is usually located in a stack region, and is accessed only by a specific processor(s). Therefore, the cache line corresponding to such a variable is arranged only in the cache memory of the specific processor. In the basic protocol described above, it is necessary to issue a signal for invalidating a copy of the variable when the writing is first effected on the variable, even if the copy of variable is not present in other cache memories. This can be avoided by adding a bit, which represents whether the copy of the cache line (variable) is present in another cache memory or not, to the state tag of the cache line. By the addition of such a bit, the state tag can selectively represents a state E (Exclusive: no copy is present in another cache memory) and a state S (Shared: copy may be present in another cache memory) in addition to the foregoing states.

The Illinois protocol will now be described. When an access request is present, and a cache line matching with an address related to the access request is not present in the cache memory (i.e., when cache mishit occurs), data is always read out from the shared memory according to the Symmetry protocol. However, according to the Illinois protocol, if a copy of the contents of the cache line causing the cache mishit is held by another cache memory (i.e., a different cache memory), the copy is transferred from the above different cache memory to the cache memory causing the cache mishit. In general, the cache memory operates faster than the shared memory so that it can be seemed that the Illinois protocol is preferable. However, if the copy is held in two or more different cache memories, it is difficult to select one from these cache memories for transferring the copy.

When a predetermined processor in the multiprocessor system has a cache line of a state tag of "D", and a different processor operates to access the above cache line via the shared bus, the predetermined processor first transfers the cache line to the shared memory, then updates the state tag of this cache line to "C", and thereafter transfers the contents of the cache line to the above different processor. According to the Symmetry protocol, the above processing is performed by writing the cache memory into the shared memory, and then transferring contents of the cache line from the shared memory to the different processor. According to the Illinois protocol, however, when the contents of the cache memory of the predetermined processor are written back into the shared memory, the data is simultaneously written into the corresponding cache line of the different processor.

Description will now be given on the Berkeley protocol. After the predetermined processor described above performs the data writing and changes the corresponding state tag of the cache line to "D", a different processor may perform the reading from this cache line. In this case, the contents of this cache line are directly transferred to the different processor without using the shared memory. As a result, the cache line is in the state of "Dirty", and the copy of this cache line is shared by the plurality of cache memories so that the state tag represents "DS" (Dirty Shared). However, if the copy of the cache line including the state tag "DS" is present in the plurality of cache memories, it is necessary to determine or specify the processor, from which the contents of the cache line are to be supplied to a further different processor, when the further different processor performs the reading from the same cache line. Accordingly, the processor (or the cache memory corresponding to this processor), which is finally responsible for each cache line, is determined. The cache memory or the shared memory, which is responsible for the cache line, is referred to as an "owner" of the cache line in question, and a right of the owner is referred to as an "ownership". When requested, the owner supplies the cache line to an requester, and is also responsible for the write back into the shared memory. If the corresponding cache line is removed from the cache memory or is invalidated, the owner is responsible for transferring the ownership to the different cache memory, or writing back the contents of the cache line to the shared data, and is also responsible for returning the ownership to the shared memory, which is a default owner.

Then, description will be given on an update-based snoop cache protocol, in which consistency in the contents is achieved by updating.

In the update-based snoop cache protocol, consistency in the contents is achieved by using the data written into the cache line of a certain cache memory, and updating a copy in a different cache memory with this written data.

The update-based snoop cache protocol can be classified into a three-state Firefly protocol, a four-state Firefly protocol and a Dragon protocol. The three-state protocol is the simplest protocol among the update-based snoop cache protocols. In the three-state protocol, when the processor writes contents into the cache line including the state tag of "CS" (Clean Shared), the corresponding copy of the cache memories of the other processors are also updated, and the contents of the shared memory are also updated. In this case, therefore, the state tag of the cache line is "CS", and cannot be "DS". When the writing is effected on the cache line including the state tag of "CE", a "DE" (Dirty Exclusive) state occurs, in which case the writing can be performed without utilizing the shared bus. When a different processor reads out a cache line including a state tag of "DE" from a cache line of a certain processor, the contents of the cache line are read after being temporarily written back into the shared memory, as is done according to the basic update-based protocol already described. Therefore, the state tag of this cache line is "CS". According to this three-state Firefly protocol, consistency in contents of the shared memory and the cache memory is frequently achieved so that the Dirty state does not occur in the plurality of cache memories. Therefore, it is not necessary to give consideration to the ownership or the like.

Description will now be given on the four-state Firefly protocol. According to this protocol, when a different processor reads out a cache line including a state tag of "DE" from a cache memory of a certain processor, the contents of this cache line are not written back into the shared memory, similarly to the Berkeley protocol, and are directly transferred to the different processor. As a result, a copy in the Dirty state is present in a plurality of cache memories, and the concept of the ownership is required. Accordingly, the four-state protocol is required, similarly to the Berkeley protocol.

Description will now be given on the Dragon protocol. According to the Dragon protocol, when data is to be written into the cache line including the state tag of "CS", contents of the shared memory are not updated, and therefore a copy in the Dirty state is present in a plurality of cache memories. Similarly to the Berkeley protocol, therefore, the cache line may selectively attains the four states "SO", "EO", "EN" and "SN". When the data is written into the cache line including the state tag of "SN" or "SO", the contents of the shared memory are not updated. Similarly to the four-state Firefly protocol, when cache mishit occurs in connection with the cache line including the state tag "SN" due to the access request by another processor, write-back into the shared memory is not performed. Accordingly, contents of this cache line are supplied to a requester from the cache memory having the cache line of the state tag "SO". According to the Dragon protocol, a change occurs in the state of the cache line including the state tag of "SO" in such a case that the cache line is removed from any one of the cache memories sharing this cache line. Only in this case, the contents of the cache line are written back into the shared memory.

The foregoing protocols can be compared as follows. In the multiprocessor system, which has a shared bus and a share memory, and operates according to the snoop cache, a manner (protocol) of handling data shared by processors determines the frequency of use of the shared bus, and significantly affects the performance of the system. Each of the protocols described above has both merits and demerits, and cannot be suitable to the all types of shared data. The suitable one between the update-based protocol and the invalidation-based protocol must be determined with consideration given to the properties of the program executed in the multiprocessor.

For example, the following results can be obtained from comparison, which is made between the update-based protocol and the invalidation-based protocol with particular consideration given to the access form of the processor. The invalidation-based protocol is effective for variables such as a local variable and others, which are very likely to be continuously accessed by one processor. The update-based protocol is effective for variables used in the case where many processors frequently change the data.

The followings can be derived from comparison, which is made between the update-based protocol and invalidation-based protocol with particular consideration given to, e.g., a hit rate for the cache memory and a sharing rate of data between the processors. The hit rate represents a rate of cache hit. The cache hit means a state, in which required data is effectively present in the cache memory. Cache mishit means a state, in which required data is not effectively present in the cache memory.

The hit rate for the cache memory and the sharing rate of data between the cache memories (processors) form important factors, which determine the efficiency of the multiprocessor system having the cache memories. As the hit rate increases, the access to the shared bus due to cache mishit decreases. As the sharing rate decreases, bus access resulting from the cache hit (write hit) to the shared data in the write operation decreases. In any one of the above cases, the bus confliction decreases, and a good efficiency is achieved. When comparing the invalidation-based protocol and the update-based protocol from the above viewpoint, it is apparent that the update-based protocol can increase a high hit rate, but also increases a sharing rate.

The followings are results of comparison made between the update-based protocol and the invalidation-based protocol with consideration given to a ping-pong effect. According to the invalidation-based protocol, two processors may share a cache line for frequently performing the writing and reading. In this case, when one of the two processors performs the writing on the cache line of the corresponding cache memory, the corresponding cache line (copy) of the cache memory of the other processor is invalidated. When the other processor subsequently performs the writing on the cache line (copy) in the corresponding cache memory, contents of the corresponding cache line of the cache memory of the above one processor are first written back into the shared memory, and then are transferred to the other processor. The contents thus transferred are written into the cache memory of the other processor, and the other processor performs the writing on the cache line. Thereby, invalidation is performed in connection with the cache line of the one processor. This is the most undesired and inefficient portion in the invalidation-based protocol.

More specifically, when two processors performs the writing or reading on the shared cache line, the above inefficient operation or processing is carried out whenever such writing or reading is performed, and contents of the cache line to be read or written are moved to and from each of the cache memories corresponding to the two processors while invalidating the other. This state is referred to as the ping-pong effect. In the update-based protocol, however, all the copy is updated with data written into the cache line, and therefore, the ping-pong effect does not occur.

The update-based protocol described above suffers from false sharing, which will now be described. It is assumed that data is transmitted or moved between two processors. When a program (task), which has been executed by one of the two processors, is moved to the other processor, the one processor no longer uses a variable related to this task. In the update-based protocol, however, the cache line is not invalidated so that the cache line including data of the variable will be valid until it is removed from the cache memory. Therefore, when the other processor writes the data into the cache line of the above variable during execution of the above task, the data (i.e., data not used by the one processor) of the corresponding cache line in the cache memory of the one processor must be updated using the shared bus, although this update is not originally necessary.

A situation similar to the above occurs in the following case. It is assumed that local variables used by one processor are stored in an upper half region of a cache line, and local variables used by the other processor are stored in a lower half region of the same cache line. In this case, according to the update-based protocol, meaningless updating of data must be performed whenever the writing is effected on the variables. This meaningless sharing of the cache line is referred to as the false sharing. According to the update-based protocol, wasteful traffic increases on the shared bus when the false sharing occurs.

For the above reasons, it can be considered that the suitable type or kind of the cache consistency protocol for the cache memory changes depending on the memory region (i.e., variable or work area). If the traffic on the shared bus can be reduced, the bus confliction is suppressed, and the connectable processors increase in number, so that the performance of the whole system increases. Therefore, many conventional systems have been devised such that the cache consistency protocol is fixed to only one kind, but the cache consistency protocol is controlled and switched dynamically corresponding to the respective memory regions for the foregoing reasons so as to reduce the traffic on the shared bus and thereby to improve the performance. For example, manners using the invalidation-based protocol and the update-based protocol in a mixed fashion have been proposed.

For example, a manner which is referred to as "Competitive snoop" has been proposed. According to this manner, the update-based protocol is first applied, and operations of updating the contents of the cache line are counted. When the count exceeds a predetermined number, the protocol changes into the invalidation-based protocol. According to this manner, unnecessary data updating can be avoided to a certain extent, but the data is invalidated in some cases while the data is being frequently exchanged between the processors. Therefore, the performance cannot be improved sufficiently.

The kind of protocol to be applied must be selected for each processor. In this manner, attention has been given to the fact that a better effect can be achieved if the invalidation-based protocol and the update-based protocol can be switched in accordance with properties of the program during execution of the program (task). More specifically, such a manner may be employed that a mechanism for controlling the cache memory is independently provided for each of the update-based protocol and the invalidation-based protocol, and switching is performed to use either of these mechanisms when executing the program. However, this manner has the following disadvantages. It is improper that one of the update-based protocol and invalidation-based protocol is determined as the effective protocol in the whole system at various points in time during execution of the task, but an appropriate protocol should be determined for each cache memory (each processor). Further, it is necessary to ensure consistency in the write operation effected on shared data during switching between the invalidation-based protocol and update-based protocol. In particular, the latter must be satisfied because control of a decentralized type is performed in the snoop cache. For satisfying the above requirements, the following measures are employed.

One item of attribute information is assigned to each cache memory. This attribute information represents either an "invalidation-based protocol mode" or an "update-based protocol mode". When write hit for shared data occurs in a certain cache memory, a copy existing in other cache memory(s) is invalidated when the attribute information of the other cache memory represents the "invalidation-based protocol mode", and is updated when the "update-based protocol mode" is represented. This manner ensures the consistency in arbitrary combinations of the "invalidation-based protocol mode" and the "update-based protocol mode". If the mechanism for controlling the cache memories can be practically achieved, this manner satisfies the former of the foregoing requirements. Thus, both the invalidation-based protocol and the update-based protocol simultaneously exist. In connection with this mechanism, the latter of the foregoing requirements is satisfied if such conditions are satisfied that the operation of switching the attribute information of each cache memory and the writing on the shared date are controlled exclusively to each other.

If the above exclusive control can be sufficiently performed in the case of decentralized control such as snoop cache, the attribute information can be switched without synchronization between the cache memories. Thus, dynamic switching of the attribute can be performed during execution of the program. However, a significant advantage cannot be achieved by changing the protocol for the same memory depending on the processor.

Description will now be given on a manner of selecting the kind of the cache consistency protocol for each page of the shared memory. "Fine Grain Support Mechanisms" (Takashi Matsumoto, pp. 91–98, Calculator Architecture Research Report Meeting No. 77–12, Information Processing Society of Japan, July 1989) has disclosed that a disadvantage due to fixing of the protocol only to one kind can be overcome if the kind of catch consistent protocol can be dynamically switched for each page.

According to the technique disclosed in the above reference, if information representing the type of the protocol for each address is added for dynamically switching the protocol, a storage region of such information and hardware for management require considerable volumes, and therefore the system cannot be efficient. Therefore, management is performed by adding information, which represents the type of protocol, to each storage region having a predetermined size. In view of easy achievement, attention is given to a page management mechanism in the following description, and it is assumed that the above information is added to each page of the shared memory. Data belonging to the page is information indicating the type of protocol to be used for access. When the processor accesses the shared memory, the type of protocol to be used for this access is indicated, and, for this indication, a signal line for externally sending a bit, which indicates the type of protocol, is provided for each processor. When the cache memory outputs an access request onto the shared bus, i.e., when data communication via the shared bus is required, a signal line indicating the type of protocol is output to the shared bus, and the shared bus is snooped while selecting the protocol based on the signal on this signal line in connection with the cache memory. According to analysis of access patterns by compiler and/or instruction of the protocol by a programmer, a variable and a work area are assigned to the page in the shared memory having a suitable type of protocol.

According to the technique disclosed in the foregoing "Fine Grain Support Mechanisms", selection of the invalidation-based protocol and the update-based protocol cannot be performed for each processor so that further fine control of the cache is absolutely impossible.

In view of the background described above, the update-based protocol is very suitable to the case where data transmission frequently occurs between the processors in the multiprocessor system. The update-based protocol has a disadvantage relating to the false sharing. Therefore, it is desired to eliminate the false sharing from the update-based protocol while using the update-based protocol as a base protocol. More specifically, if it is possible to determine, in advance, an address of a variable, which is frequently accessed by a certain processor, the false sharing can be reduced, and the hit rate for the cache memory can be increased.

In a reference "High-Performance Multiprocessor Workstation (TOP-1)" (Atsushi Moriwaki and Shigenori Shimizu, pp. 1456–1457, Information Processing Society of Japan 38th (1989) Meeting Transactions), it is suggested to use both the update-based protocol and the invalidation-based protocol. However, this reference has disclosed no suggestion for avoiding the foregoing false sharing so that bus confliction of the shared bus cannot be avoided.

Japanese Patent Laying-Open No. 2001–109662 has disclosed a manner, in which data on a cache memory in a multiprocessor system is managed by subdividing its state corresponding to respective blocks for improving a performance of access to the cache memory. The manner disclosed in this reference cannot likewise suppress the false sharing, and therefore cannot avoid wasteful use of the shared bus.

SUMMARY OF THE INVENTION

An object of the invention is to provide a cache device, which can lower a data sharing rate between cache memories.

Another object of the invention is to provide a cache device, which can improve a hit rate for a cache memory.

According to an aspect of the invention, a cache device is connected to a shared memory shared and accessed by a plurality of processors via a bus. The cache device is provided corresponding to each of the plurality of processors for controlling a cache memory provided for each of the processors. The cache memory includes a plurality of data regions for temporarily storing information including data read from a designated address in the shared memory and the designated address. The cache devices perform mutual input and output via the bus.

When it is detected that the data designated by the address belonging to a predetermined address space of the corresponding processor in the cache memory is updated, the cache device outputs an invalidation request including the address for designating the data via the bus if the data is stored in one or more the other cache memories. The cache device invalidates contents of the data region of the cache memory storing the address of the input invalidation request when the cache device is supplied with the invalidation request via the bus from the different cache device.

This predetermined address space is individually assigned in the shared memory corresponding to each of the plurality of processors, and stores data to be accessed most frequently by the corresponding one among the plurality of processors.

A cache device according to an another aspect of the invention may have the following features. A cache device is connected to a shared memory shared and accessed by a plurality of processors via a bus. The cache device is provided corresponding to each of the plurality of processors for controlling a cache memory provided for each of the processors.

The cache memory includes a plurality of data regions for temporarily storing information including data read from a designated address in the shared memory and the designated address. The cache devices perform mutual input and output via the bus. The cache device has a dedicated access portion and a non-dedicated access portion.

The dedicated access portion accesses one or more among the plurality of data regions storing an address belonging to a predetermined address space for the processor corresponding to the cache memory. The non-dedicated access portion accesses the remaining one or more data regions.

When the update request is input for updating the data, the dedicated access portion updates contents of the data region in the cache memory storing the address of the input update request based on the input update request if it is detected that the address of the input update request belongs to the predetermined address space for the corresponding processor. When it is detected that the corresponding processor updated the data in the remaining data region, the non-dedicated access portion outputs the update request including the updated data and the address designating the updated data via the bus. This predetermined address space is individually assigned in the shared memory corresponding to each of the plurality of processors, and stores data to be accessed most frequently by the corresponding one among the plurality of processors.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In each of the embodiments, a multiprocessor system includes four processors. However, the invention is not restricted to this provided that the multiprocessor includes two or more processors.

(First Embodiment)

Figure 1:
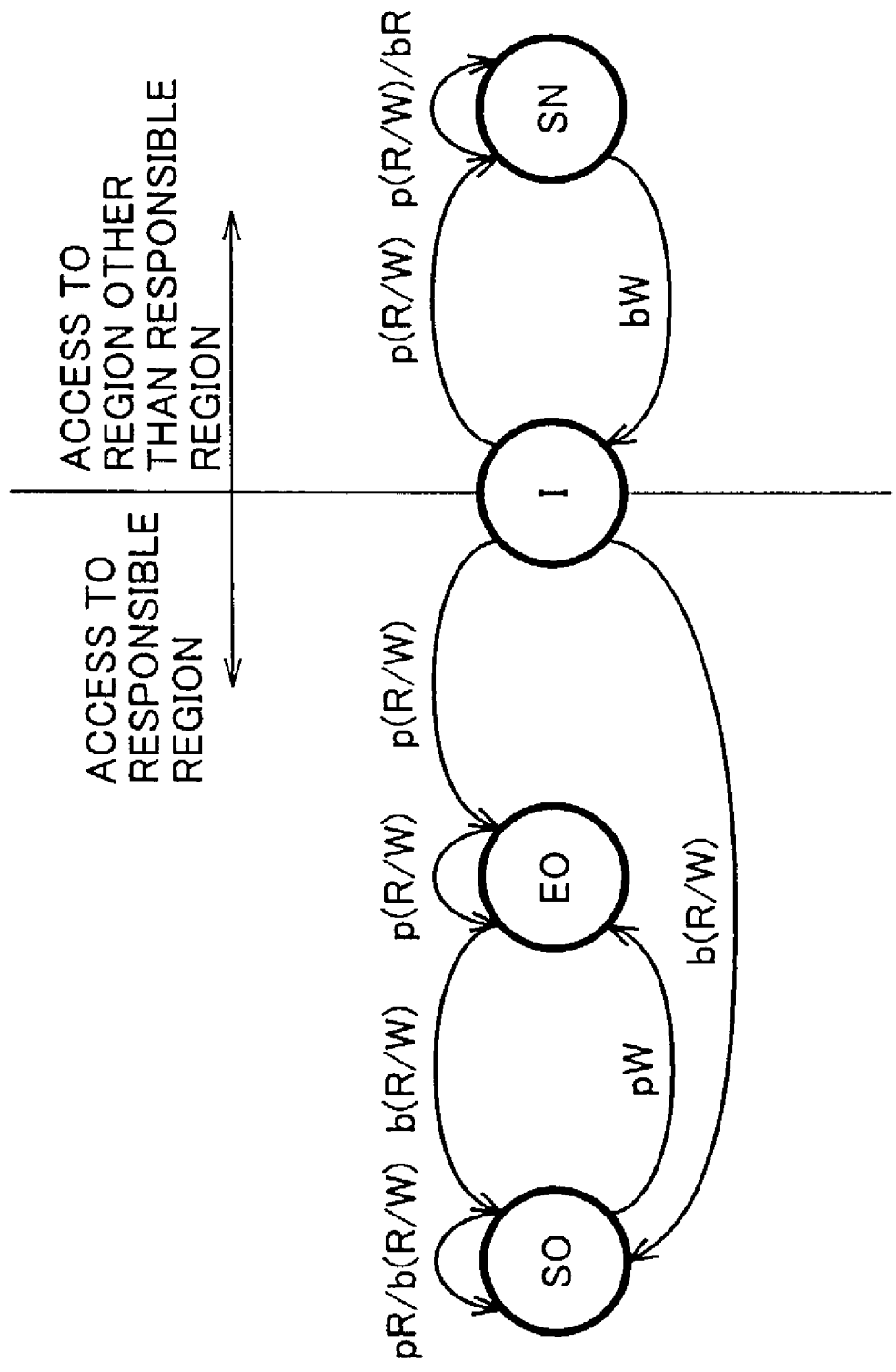
FIG. 1 is a state transition diagram of a cache consistency protocol according to a first embodiment of the invention.
Figure 2:
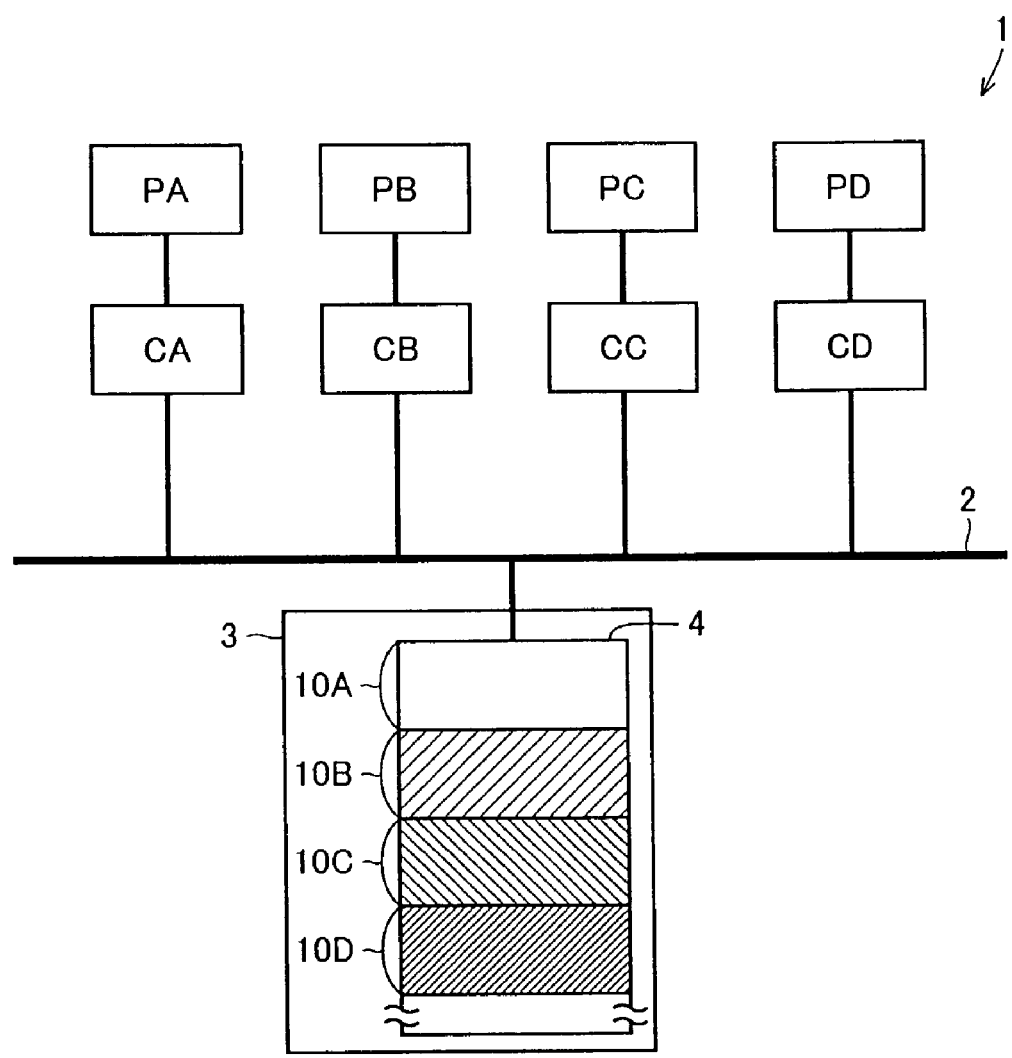
FIG. 2 shows a structure of a multiprocessor system according to the first embodiment.
Figure 3:
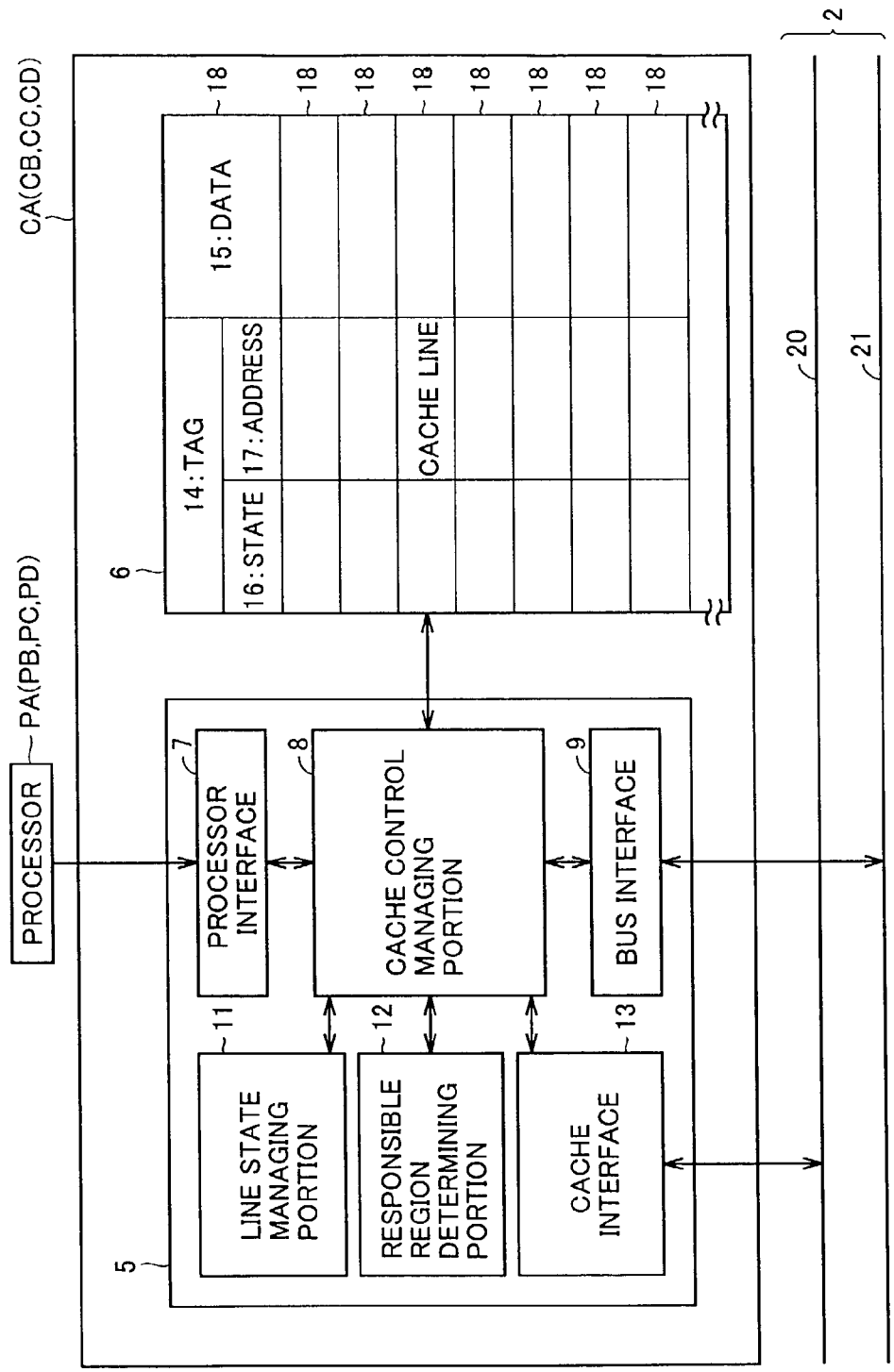
FIG. 3 shows a structure of a cache device according to the first embodiment.
Figure 4:
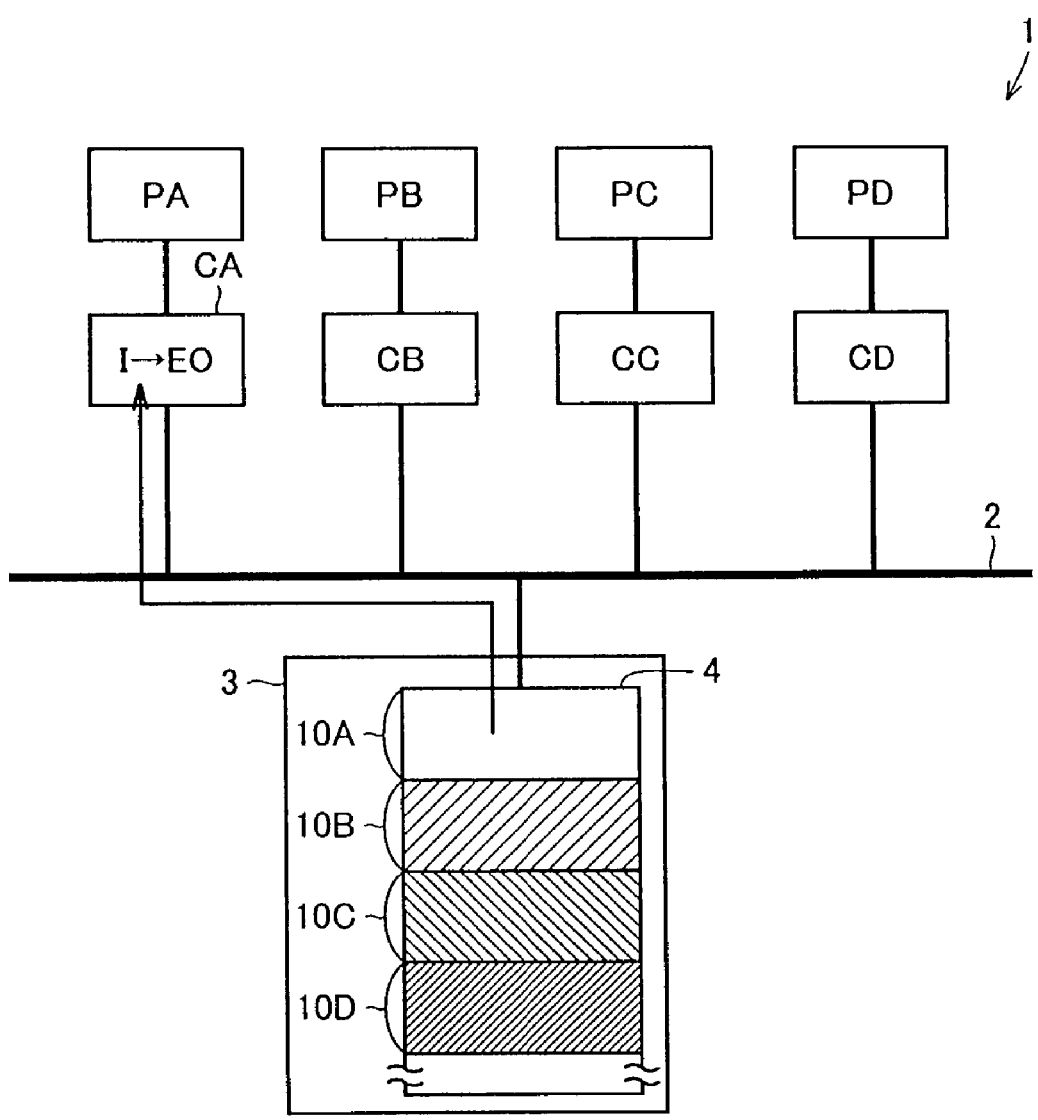
FIG. 4 is a diagram showing state transition during reading from a cache line in an "I" state for a responsible region according to the first embodiment.
Figure 5:
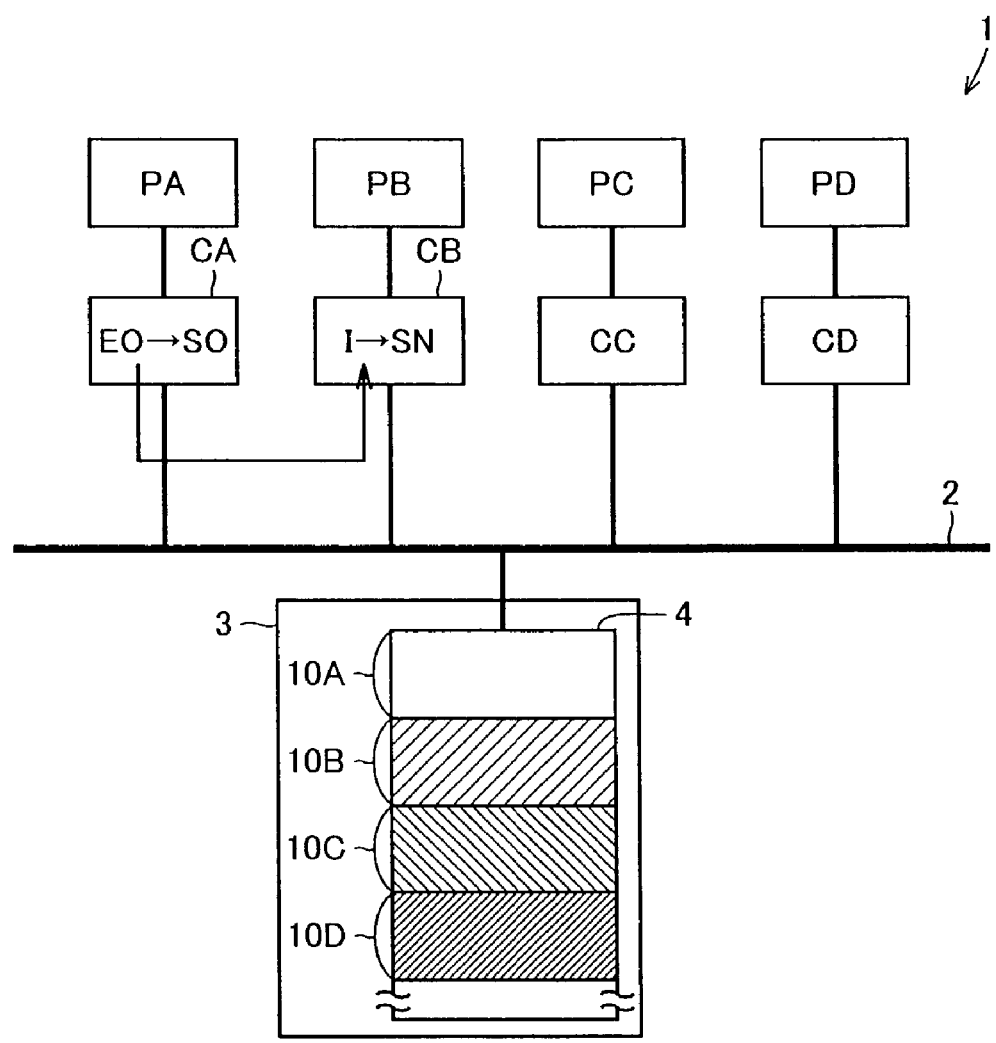
FIG. 5 is a diagram showing state transition during reading from the cache line in the "I" state for a region other than the responsible region according to the first embodiment.
Figure 6:
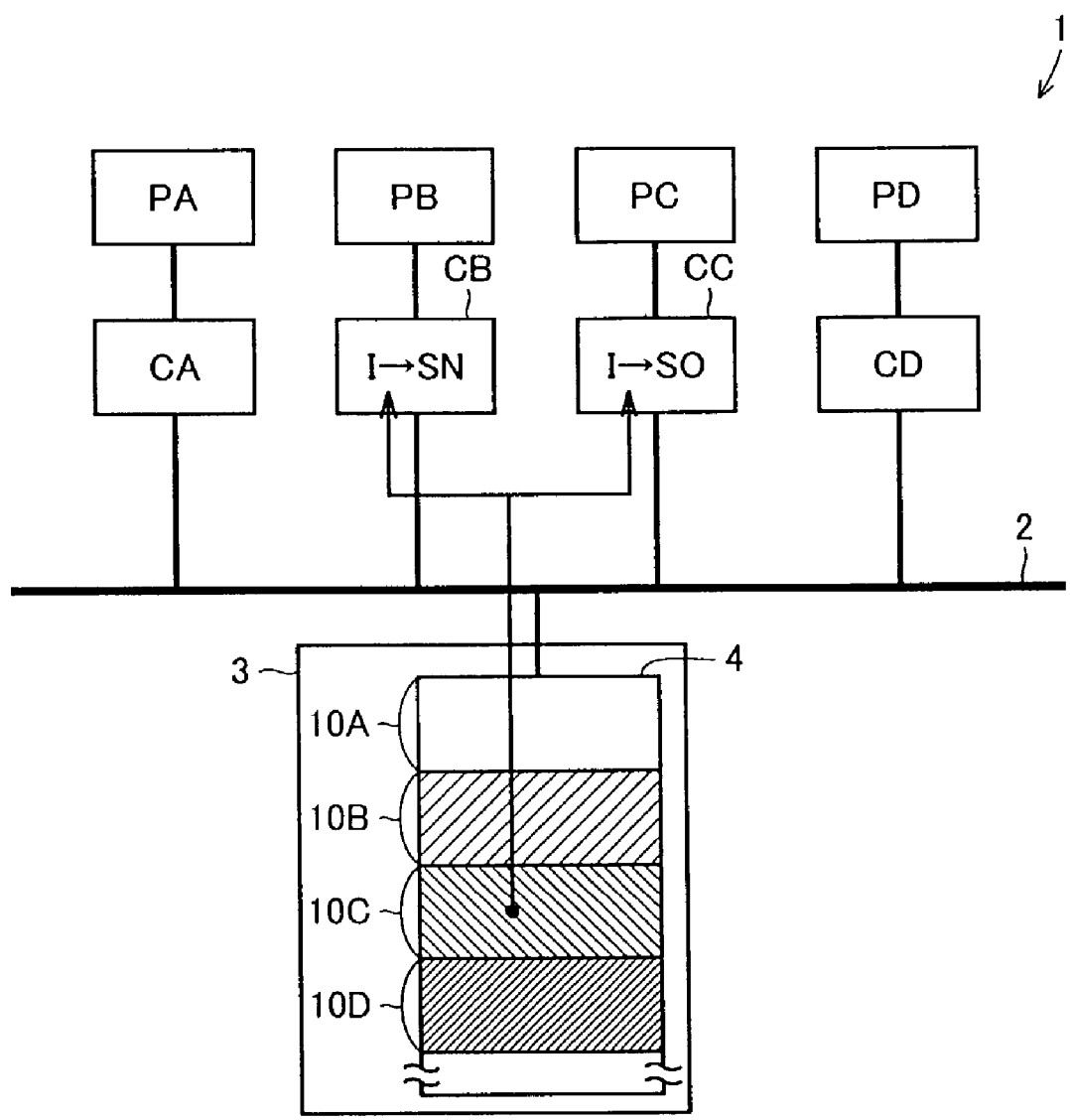
FIG. 6 is a diagram showing state transition during reading from the cache line in the "I" state for a region other than the responsible region according to the first embodiment.
Figure 7:
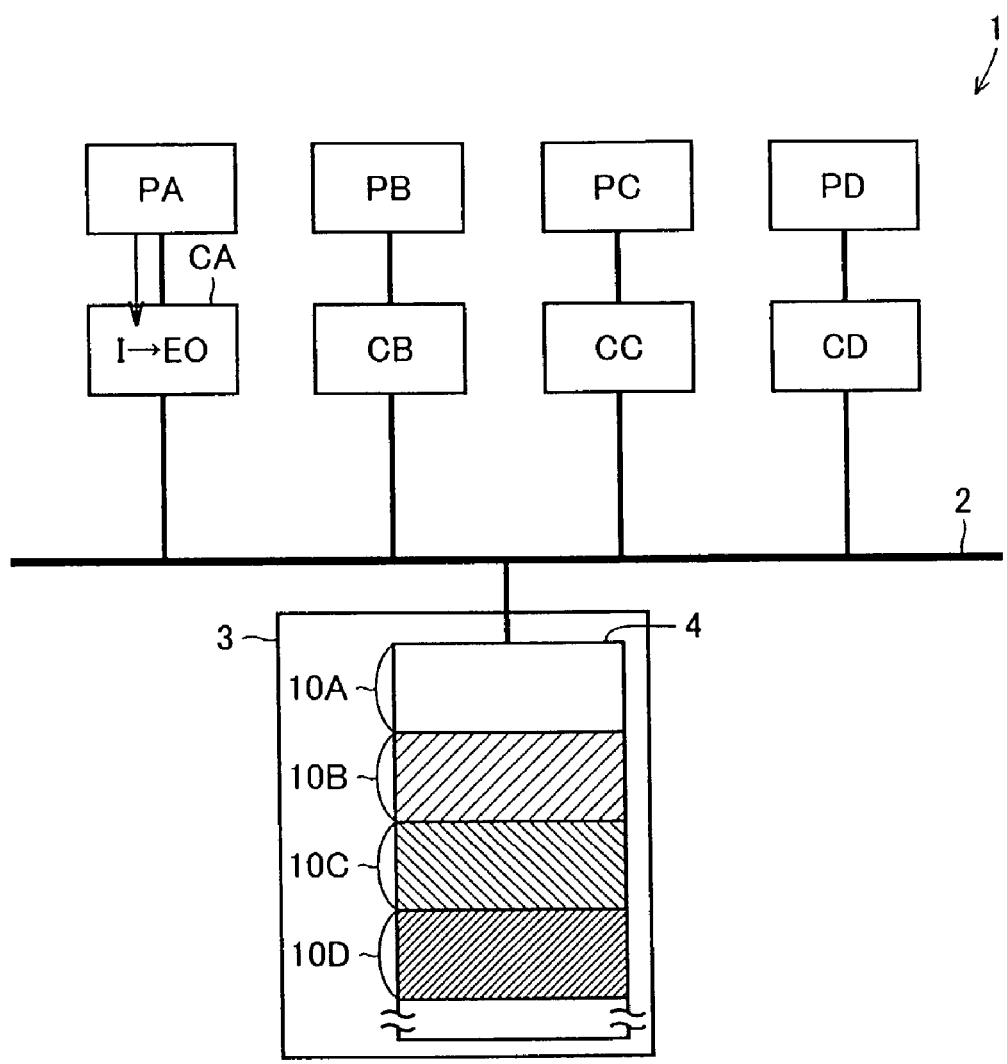
FIG. 7 is a diagram showing state transition during writing into the cache line in the "I" state for the responsible region according to the first embodiment.
Figure 8:
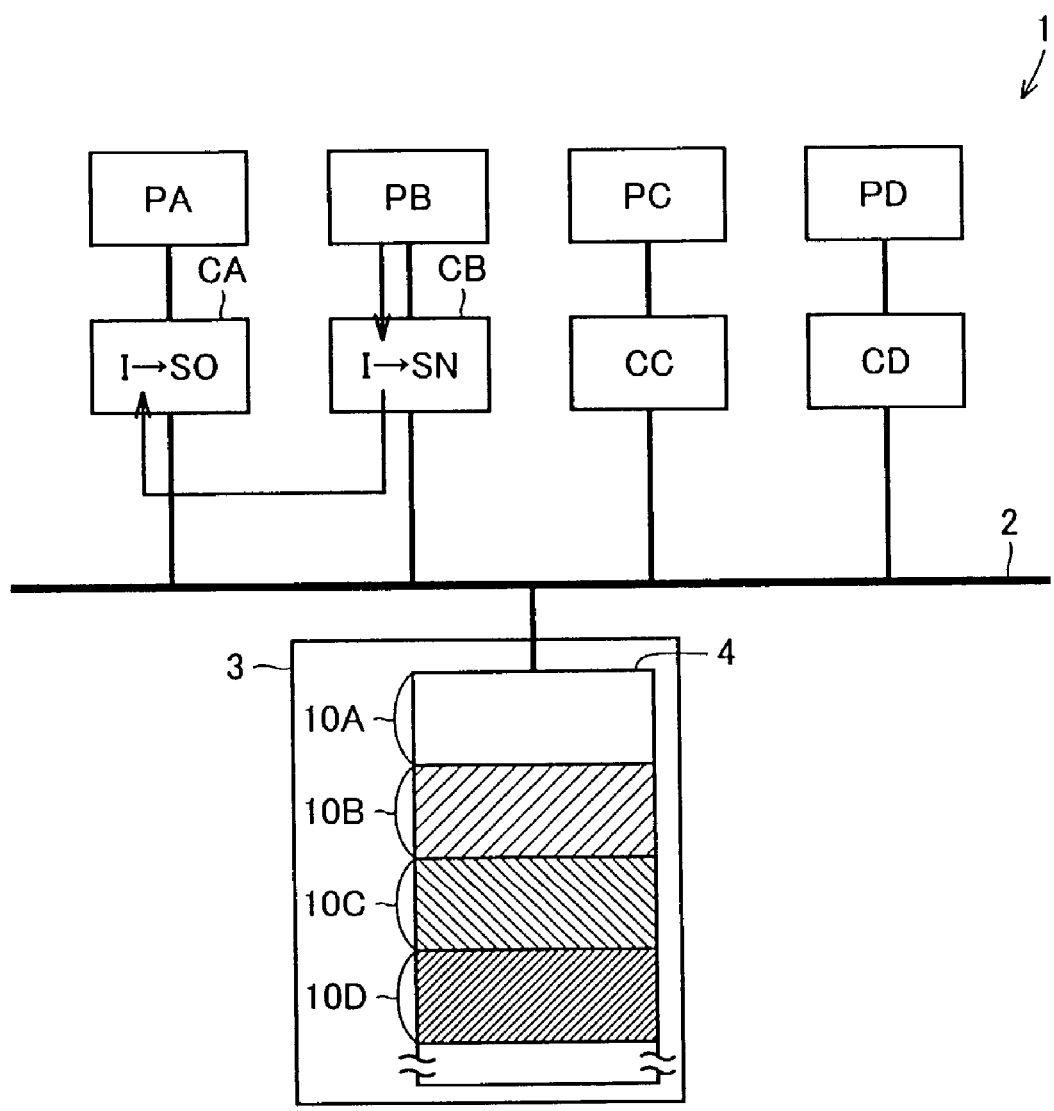
FIG. 8 is a diagram showing state transition during writing into the unshared cache line in the "I" state for a region other than the responsible region according to the first embodiment.
Figure 9:
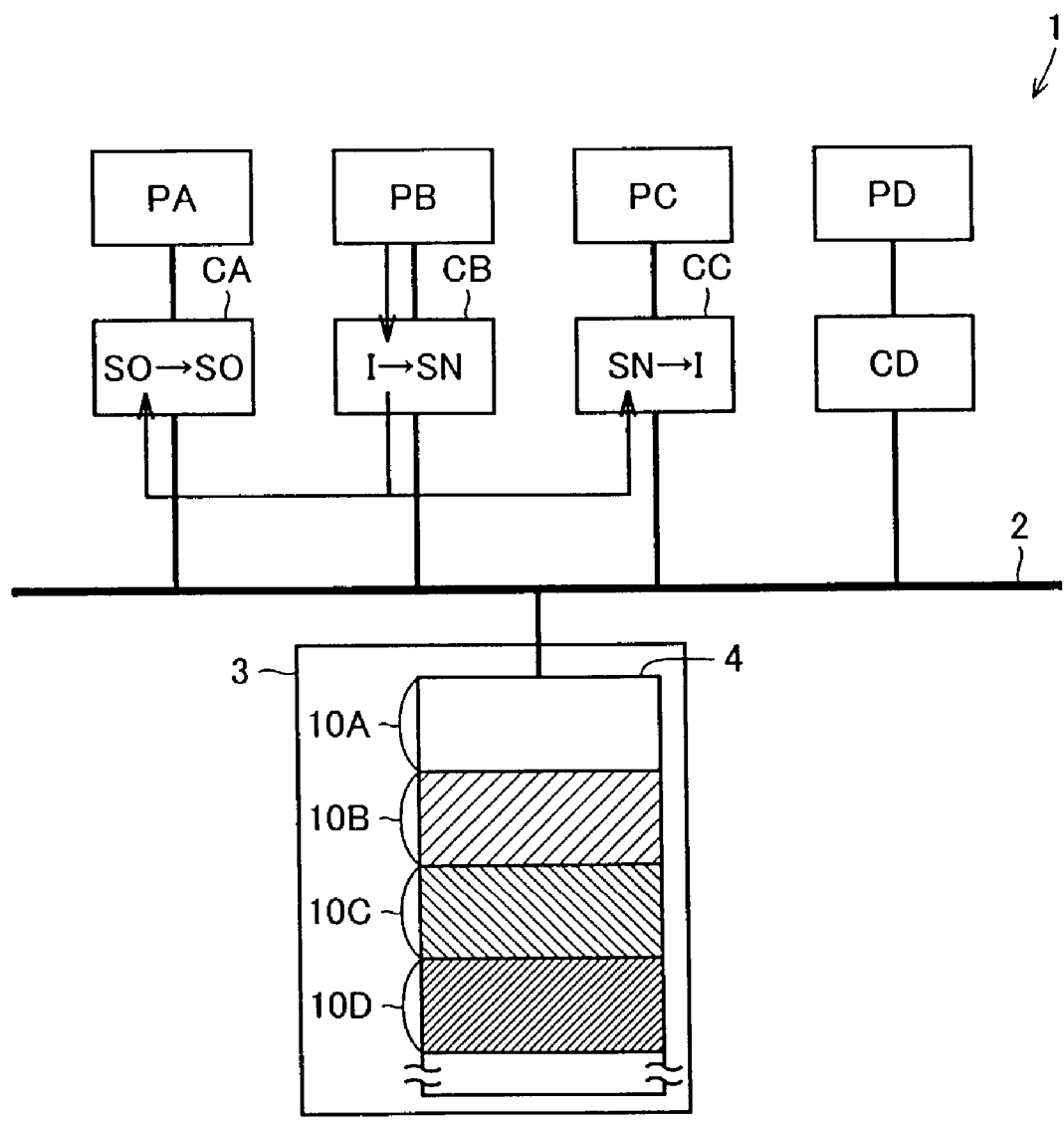
FIG. 9 is a diagram showing state transition during writing into the shared cache line in the "I" state for a region other than the responsible region according to the first embodiment.

FIG. 1 shows a state transition according to a cache consistency protocol of a first embodiment of the invention. FIG. 2 shows a schematic structure of a multiprocessor system in the first embodiment. FIG. 3 shows a structure of a cache device together with a peripheral portion in the first embodiment.

In FIG. 2, a multiprocessor system 1 includes processors PA, PB, PC and PD each including a CPU (Central Processing Unit), cache devices CA, CB, CC and CD connected to processors PA, PB, PC and PD, respectively, a shared bus 2 and a main memory device 3 including a shared memory 4. Multiprocessor system 1 employs cache snoop. For discrimination from a cache line, a region, which is accessed by one time an addressing in the shared memory, is referred to as a memory line.

Assuming that each memory line on shared memory 4 will be frequently accessed from a processor, which is determined in advance, in multiprocessor system 1, and a region storing data, which will be accessed most frequently by the processor, on shared memory 4 is referred to as a responsible region of the processor. In the first embodiment, as shown in FIG. 2, responsible regions 10A, 10B, 10C and 10D, which are continuously arranged in leading and succeeding portions of shared memory 4, are assigned to processors PA, PB, PC and PD, respectively. In FIG. 2 as well as FIGS. 4–13, 15, 16, 18 and 20, which will be referred to later, some responsible regions are hatched in different patterns for discrimination, respectively.

Since cache devices CA, CB, CC and CD have substantially the same structure, cache device CA will now be described in greater detail. Referring to FIG. 3, cache device CA includes a cache controller 5 and a cache memory 6.

Cache controller 5 includes a processor interface 7, a cache control managing portion 8 accessing cache memory 6, a bus interface 9, a line state managing portion 11, a responsible region determining portion 12 and a cache interface 13. Shared bus 2 includes an inter-cache communication line 20 for data communication between the cache devices and a system bus 21 for communication between each cache device and main memory device 3.

Cache memory 6 has a plurality of cache lines 18. Each cache line 18 includes a tag 14 and a data 15. Tag 14 includes a state tag 16, which can represent multiple kinds of states of cache line 18 according protocols shown in FIG. 1, and an address tag 17 representing an address related to this cache line 18. When cache control managing portion 8 designates an address in cache memory 6 in accordance with an access request, address tag 17 indicating an address, which matches with the designated address, may be present, or may not be present. If present, this state is referred to as "address hit". If not present, this state is referred to as "address mishit".

Processor interface 7 connects corresponding processor PA to cache controller 5. Bus interface 9 connects cache controller 5 to system bus 21. Cache interface 13 connects cache controller 5 to inter-cache communication line 20. When cache control managing portion 8 receives an access request from processor PA via processor interface 7, or receives an access request from another processor via cache interface 13, cache control managing portion 8 accesses (refers (reads) or writes) contents of cache line 18, which corresponds to address tag 17 designated based on the access request, in cache memory 6 based on applied information.

When the access request is issued, line state managing portion 11 determines, in accordance with the protocol shown in FIG. 1, a state to be exhibited by state tag 16 of cache line 18 corresponding to address tag 17, which is designated based on the access request. When the access request is issued, responsible region determining portion 12 determines whether the address designated based on the access request falls within the responsible region of the processor or not.

FIG. 1 shows transitions of a state of cache line 18, that is, a value of corresponding state tag 16 in accordance with the cache consistency protocol. Referring to FIG. 1, state tag 16 of cache line 18, which has been set to a default of "I" (invalid), is changed to "EO" (Exclusive owner), "SO" (Shared owner) or "SN" (Shared non-owner) in accordance with a form or manner of access (i.e., a kind of the access request) to cache line 18.

When state tag 16 is "I", this represents that the contents of corresponding cache line 18 are not ensured. When state tag 16 is "SO", the system is in such a state that contents (copy) of corresponding cache line 18 are shared by two or more processors (cache memories 6), and the owner of cache line 18 is corresponding cache memory 6. When state tag 16 is "EO", the system is in such a state that contents (copy) of corresponding cache line 18 are not shared by the plurality of processors (cache memories 6), and the owner of cache line 18 is corresponding cache memory 6. When state tag 16 is "SN", the system is in such a state that contents (copy) of corresponding cache line 18 are shared by two or more processors (cache memories 6), and the owner of cache line 18 is not corresponding cache memory 6, but is another cache memory 6 or shared memory 4.

When the processor issues the access request targeted for its own responsible region, the state changes in a manner represented by "access to responsible region" in FIG. 1. If the access request is targeted for a region other than its own responsible region, the state changes in a manner represented by "access to region other than responsible region" in FIG. 1. Referring to FIG. 1, the manner of accessing cache line 18 can be classified into access pR and access pW representing reading and writing effected on cache line 18 by the processor connected to the cache device of the same cache line 18, respectively, and access bR and access bW representing reading and writing effected on cache line 18 by another processor (another cache controller 5) via shared bus 2. In FIG. 1, access p(R/W) represents access pR or pW, and access b(R/W) represents access bR or bW. Further, access pR/b(R/W) represents access pR, bR or bW, and access p(R/W)/bR represents access pR, bW or bR.

FIGS. 4–12 schematically shows manners, in which the value of state tag 16 of cache line 18 to be accessed changes during operations according to the state transitions shown in FIG. 1.

Description will now be given on the manner of updating state tag 16 of cache line 18, using line state managing portion 11 shown in FIG. 3. When cache control managing portion 8 receives an access request from processor interface 7 or cache interface 13, cache control managing portion 8 applies an address included in the received access request to responsible region determining portion 12, and also determines the type (access pR, pW, bR or bW) of the received access request for applying access type information representing results of this determination to line state managing portion 11. At this time, cache control managing portion 8 accesses cache memory 6 based on the received access request, and reads state tag 16 of address-hit cache line 18 for applying it to line state managing portion 11, if the address hit occurs. Responsible region determining portion 12 determines whether the applied address falls within the responsible region of the corresponding processor or outside the same, and outputs region determination information representing results of this determination to cache control managing portion 8. Cache control managing portion 8 applies the region determination information, which is received from responsible region determining portion 12, to line state managing portion 11. Therefore, line state managing portion 11 determines the next state for transition in accordance with the manner shown in FIG. 1 based on the access type information applied from cache control managing portion 8 as well as state tag 16 and the region determination information, and applies the state data representing the determined state to cache control managing portion 8. Cache control managing portion 8 writes the applied state data into state tag 16 corresponding to address-hit cache line 18 to update the value of this state tag 16. The above processing will be referred to as "state update processing" hereinafter. Cache control managing portion 8 accesses (reads or writes) data 15 of cache line 18 based on the access request. Cache control managing portion 8 may be configured to eliminate the updating of state tag 16 when the state data matches with the value of state tag 16, which is already read.

When cache control managing portion 8 receives access request from cache interface 13, cache control managing portion 8 determines whether the received access request is targeted at itself or not, based on the region determination information of responsible region determining portion 12 relating to the address of the received access request. More specifically, if the region determination information represents the address falling within the responsible region, responsible region determining portion 12 determines that the request is targeted at itself. If the region determination information represents the address falling outside the responsible region, responsible region determining portion 12 determines that the request is not targeted at itself.

A specific operation of according to the cache consistency protocol shown in FIG. 1 will now be described. First, the case where the processor issues an access request for a predetermined address will be described with reference to FIGS. 4–12.

In the case of referring to (reading from) an address in the responsible region, it is assumed that processor PA issues an access request, which refers to an address in responsible region 10A, to cache device CA. This access request is applied via processor interface 7 to cache control managing portion 8. When state tag 16 of cache line 18 at the address, which is hit based on the access request, represents "I", cache control managing portion 8 reads out contents of the memory line corresponding to the address of the access request from responsible region 10A in shared memory 4 via bus interface 9 and system bus 21, and writes the contents into cache line 18 at the address, which is hit immediately before, in cache memory 6. At this time, the state update processing already described is performed so that state tag 16 of the cache line 18 is updated from "I" to "EO" (see FIG. 4). In this description, contents, which are read out from shared memory 4 and are written into cache line 18 of cache memory 6, are referred to as a "copy".

Then, description will be given on the case where an address outside the responsible region is referred to. It is assumed that processor PB issues an access request for referring to an address falling within a region other than its responsible region 10B (e.g., an address in responsible region 10A of processor PA). In this case, the access request is issued to cache device CB so that cache control managing portion 8 of cache device CB reads out state tag 16 of address-hit cache line 18 based on the access request of cache memory 6. It is assumed that state tag 16 thus read is "I". Cache control managing portion 8 outputs via cache interface 13 a copy request signal instructing request of the copy corresponding to the above access-request address because read state tag 16 is "I", and the region determination information applied from responsible region determining portion 12 represents the region outside the responsible region.

Since this copy request signal is sent via inter-cache communication line 20, cache control managing portion 8 of each of other cache devices CA, CC and CD receives this copy request signal via cache interface 13. In cache device CA, i.e., the cache device, which determines that the address indicated by the copy request signal thus received falls within its own responsive region, cache control managing portion 8 determines whether address-hit occurs or not, i.e., whether the copy is present in cache memory 6 or not, based on the address of the received copy request signal. If the address-hit occurs, and state tag 16 of the copy is "EO", cache control managing portion 8 of cache device CA reads the copy (data 15), and sends a response signal for the copy request signal together with the read copy to cache device CB, i.e., the requester.

At this time, since cache device CA processes the received copy request signal as an access request, state tag 16 of cache line 18 corresponding to the copy is updated from "EO" to "SO" by the state update processing already described. Cache control managing portion 8 of cache device CB receives the copy together with the response signal sent from cache device CA, and writes the received copy into address-hit cache line 18 in cache memory 6. At this time, the state update processing is performed so that state tag 16 of cache line 18 is updated from "I" to "SN" (see FIG. 5).

It is assumed that processor PB issues an access request referring to an address in a region other than its responsible region 10B (e.g., responsible region 10C of processor PC). In this case, the access request is applied to cache device CB so that cache control managing portion 8 of cache device CB reads state tag 16 of cache line 18 at the hit address in cache memory 6 based on the access request. It is assumed that read state tag 16 represent "I". Cache control managing portion 8 issues a copy request signal because state tag 6 thus read represents "I", and the region determining information applied from responsible region determining portion 12 represents the region other than the responsible region.

Since this copy request signal is sent via inter-cache communication line 20, cache control managing portion 8 of each of other cache devices CA, CC and CD receives the copy request signal. Since only cache device CC determines that the address designates itself, cache control managing portion 8 determines based on the address indicated by the received copy request signal whether the address hit occurs or not, i.e., whether the copy is present in corresponding cache memory 6 or not. When cache control managing portion 8 determines that the copy is not present, it sends a response signal, which represents that the copy is not present, to the cache device CB, i.e., the requester.

When cache control managing portion 8 of cache device CB receives the response signal, it writes the memory line (copy) read by accessing shared memory 4 based on the address of the access request, which is received immediately before, into cache line 18 at the hit address in corresponding cache memory 6. At this time, the state update processing already described is performed so that state tag 16 of cache line 18, into which the copy is written, is updated from "I" to "SN". When cache control managing portion 8 of cache device CC sends the response signal, it writes the copy read from shared memory 4 into cache line 18 at the address, which is hit immediately before, in corresponding cache memory 6, similarly to the case of cache device CB. At this time, the state update processing already described is performed so that state tag 16 of cache line 18, into which the copy is written, is updated from "I" to "SO" (see FIG. 6).

Description will now be given on the case where processor issues an access request for writing at a predetermined address. First, it is assumed that processor PA issues an access request corresponding to the address in responsible region 10A for writing into cache line 18 including state tag 16 in the "I" state. In this case, when cache control managing portion 8 of cache device CA receives this access request via processor interface 7, it writes data 15 into address-hit cache line 18 based on the received access request. At this time, the foregoing state update processing is effected on cache line 18 carrying data 15 thus written. As a result, state tag 16 of this cache line 18 is updated from "I" to "EO" (see FIG. 7). In this case, shared bus 2 is not used for the process of the access request.

Then, description will be given on the case where processor PB issues an access request for writing at an address in a region other that responsible region 10B (e.g., at an address in responsible region 10A). Cache device CB receiving this access request writes data 15 into address-hit cache line 18 in cache memory 6 based on the access request. It is assumed that state tag 16 of this cache line 18 has been "I". The state update processing is performed to update state tag 16 from "I" to "SN". Thereafter, cache control managing portion 8 sends the received access request via inter-cache communication line 20 for requesting the updating of this data because the region determination information applied from responsible region determining portion 12 represents "outside the responsible region". Thereby, other cache devices receive the access request thus sent.

It is assumed that address hit occurs only in cache device CA among the other cache devices. Cache control managing portion 8 of cache device CA writes data 15 into address-hit cache line 18 based on the access request. At this time, state update processing is also performed in cache device CA. Assuming that state tag 16 of cache line 18, into which data 15 is written, has been "I", this state tag 16 is updated from "I" to "SO" (see FIG. 8).

In the above case, if state tag 16 corresponding to address-hit cache line 18 in cache device CA has not been "I", but has been "SO", this means that a processor sharing the copy of cache line 18 exists in addition to processors PA and PB. For example, it is assumed that processor PC shares the copy together with processors PA and PB. In this case, address-hit occurs also in cache device CC, and the state update processing is also effected for address-hit cache line 18 so that corresponding state tag 16 is updated from "SN" to "I" (see FIG. 9).

As shown in FIGS. 5, 6, 8 and 9, variables (contents of cache line 18), which are likely to be referred to by another processor (e.g., processor PB), are kept in "SN" even after the above processing. Therefore, the cache hit rate increases in the case where the variables corresponding to the responsible region are referred to by another processor, and it is possible to avoid the use of shared bus 2. In the case shown in FIG. 9, the sharing rate of the data in the responsible region can be reduced.

Description will now be given on the case where processor PA issues the access request for writing the data into the address belonging to responsible region 10A. It is assumed that cache line 18 at the address, which is hit based on the access request, includes state tag 16 of "EO". In this case, shared bus 2 is not used, data 15 is written into cache line 18, and corresponding state tag 16 remains at "EO" as a result of the state update processing (see FIG. 10).

Figure 10:
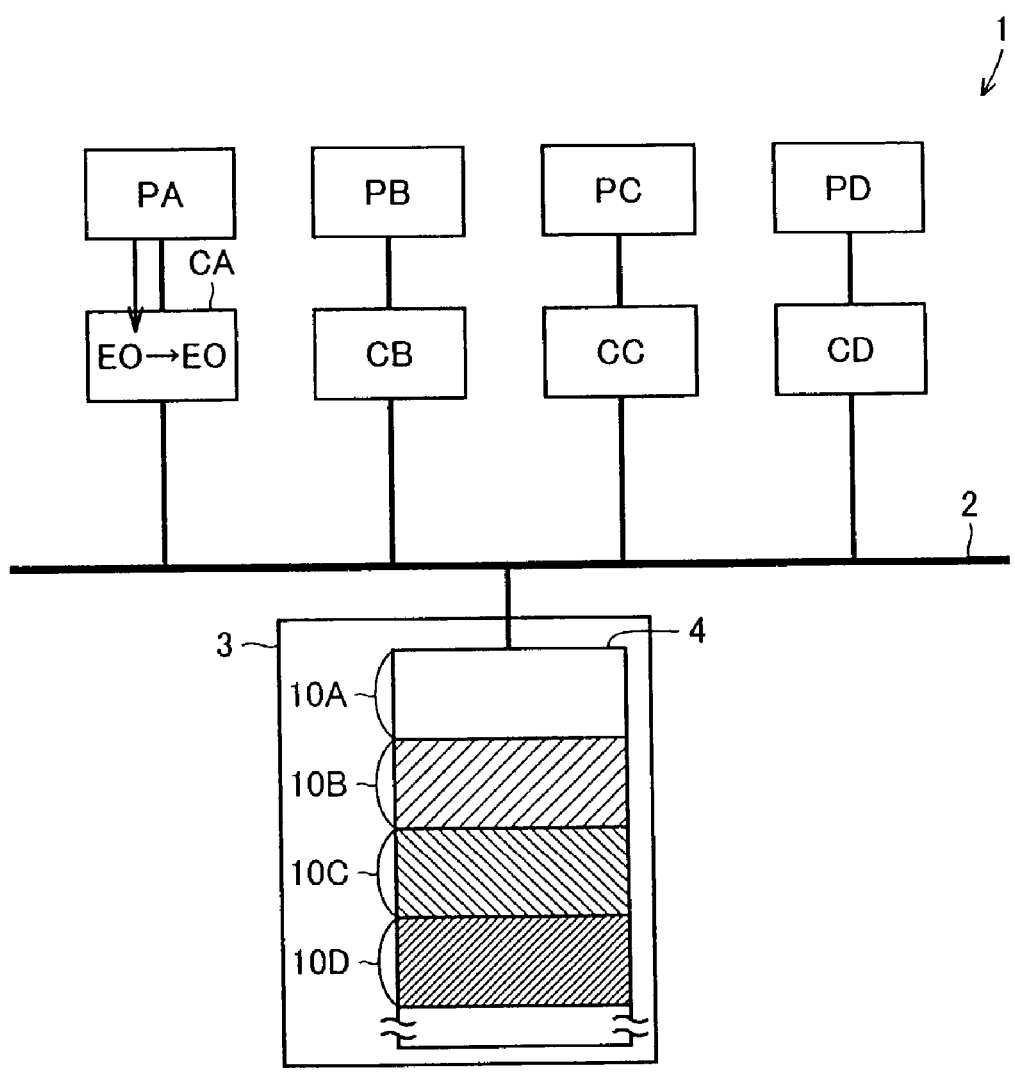
FIG. 10 is a diagram showing state transition during writing into the cache line in an "EO" state for the responsible region according to the first embodiment.
Figure 11:
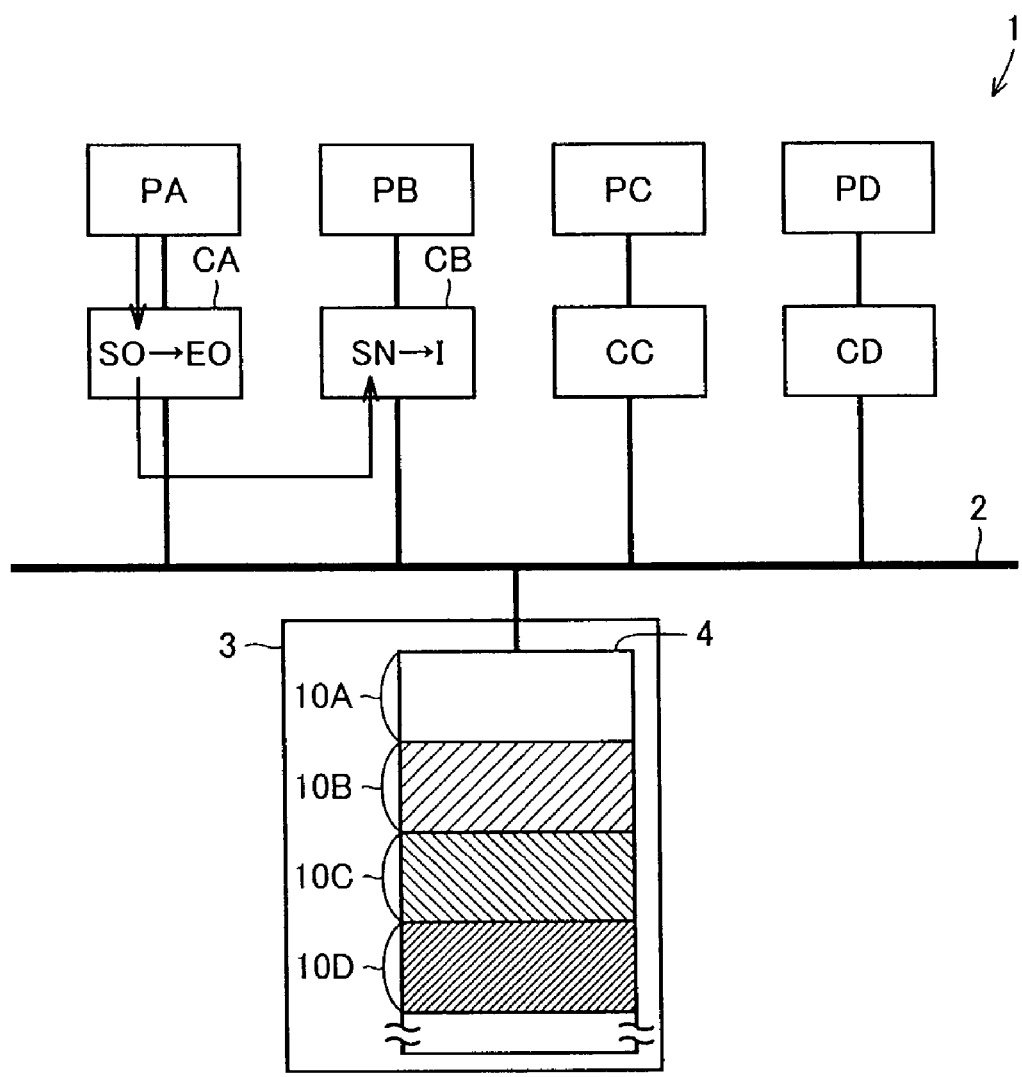
FIG. 11 is a diagram showing state transition during writing into the cache line in an "SO" state for the responsible region according to the first embodiment.

In the foregoing example shown in FIG. 10, state tag 16 of cache line 18, into which data 15 is written in accordance with the access request, is "EO". Description will now be given on the case where state tag 16 is "SO" in contrast to the above. In this state, it is assumed that processor PB shares a copy of cache line 18. In this case, data 15 is written into cache line 18 in cache device CA, and corresponding state tag 16 is changed from "SO" to "EO" by the state update processing. For requesting invalidation of a copy of this cache line 18, which is shared by another cache memory, cache device CA sends this access request via inter-cache communication line 20. Cache control managing portion 8 of cache device CB receives this access request via inter-cache communication line 20, and writes data 15, based on the received access request, into cache line 18 at the address, which is hit based on the received access request. At this time, state tag 16 corresponding to cache line 18 is updated from "SN" to "I" by the state update processing so that the sharing state of data is eliminated (see FIG. 11).

Then, description will be given on the case where processor PB issues an access request for writing into an address belonging to, e.g., responsible region 10A (i.e., a region other responsible region 10B). In this case, a copy of cache line 18, of which address is hit based on the above access request, is shared by cache devices CA, CB and CC.

Status tag 16 of this copy (cache line 18) is "SN" in cache devices CB and CC, and is "SO" in cache device CA.

Figure 12:
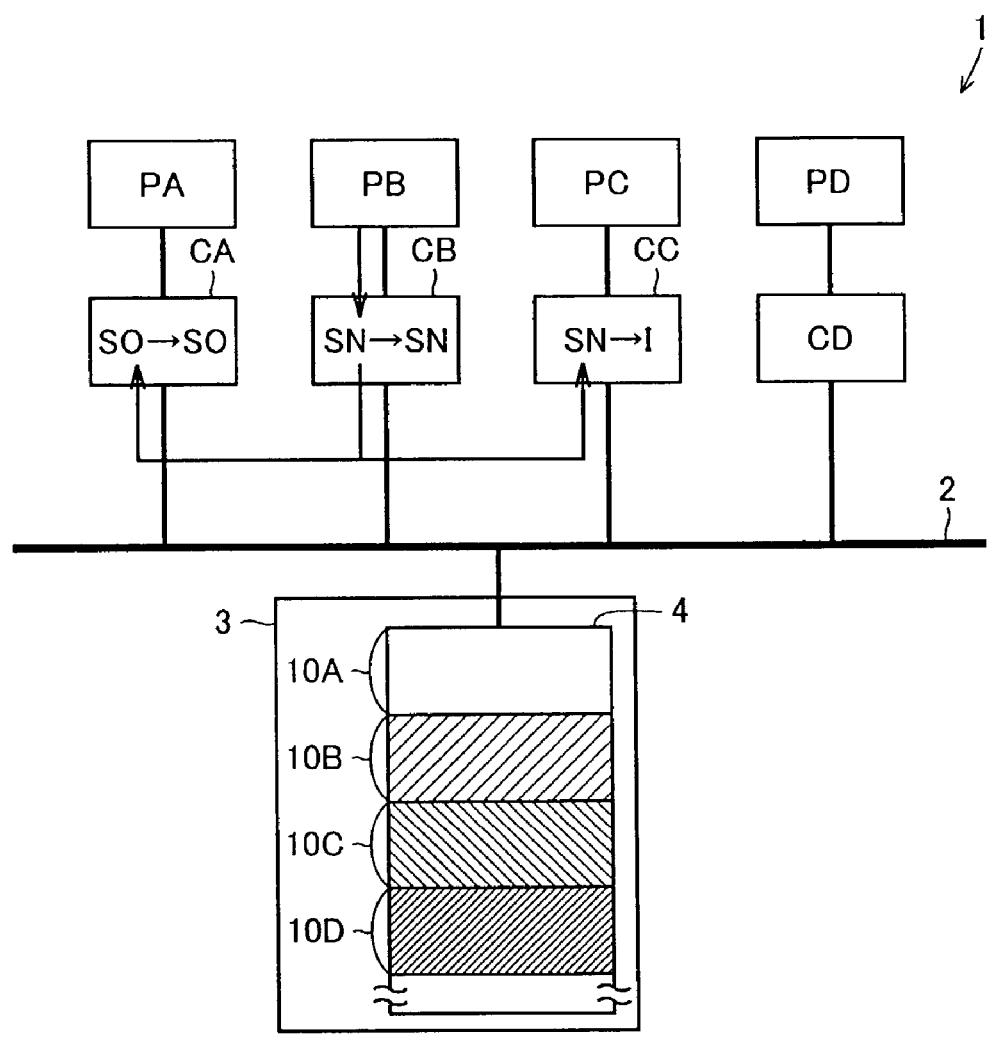
FIG. 12 is a diagram showing state transition during writing into the cache line in an "SN" state for the responsible region according to the first embodiment.

In this case, cache device CB operates to write data 15 into cache line 18 at the address, which is hit based on the access request applied from processor PB. Even after this operation, processor PB is likely to refer to this cache line 18. Therefore, state tag 16 of this cache line 18 remains at "SN" owing to the state update processing. This access request is sent from cache device CB via inter-cache communication line 20 to each of the other cache devices. Each of cache devices CA and CC updates the corresponding copy (cache line 18) at the address, which is hit based on the received access request, and the state update processing updates state tag 16 corresponding to this copy. As a result, cache device CA leaves state tag 16 corresponding to the copy at "SO", but cache device CC changes corresponding state tag 16 from "SN" to "I" because this copy is less likely to be referred to so that the data sharing rate lowers (see FIG. 12). In FIG. 12, state tag 16 of the copy in cache device CB remains at "SN". However, this state tag 16 may be updated to "I" similarly to the copy of cache device CC for further lowering the sharing rate of the data (copy) between cache memories 6.

When cache line 18 in the responsible region is to be removed from cache memory 6, this removal is performed in accordance with a write back method as follows. When state tag 16 of cache line 18 is "EO", contents of the cache line 18 are write back into shared memory 4. When state tag 16 is "SO", the contents are written back into shared memory 4. At this time, state tag 16 of the copy (cache line 18) shared by each of other cache memories 6 is updated from "SN" to "I". Removed cache line 18 is no longer necessary, and may be specified, e.g., in accordance with LRU (Least Recently Used).

Since cache line 18, which is frequently accessed, and thus is located within the responsible region, is processed in the write back method, it is possible to reduce the access frequency (utilization frequency of shared bus 2) of shared memory 4, as compared with the write through method.

In the above structure, the responsible regions of the processors are arranged in continuous address spaces on shared memory 4, respectively. Therefore, when each processor accesses a certain address, the processor, of which responsible region corresponds to the accessed address, can be determined from higher two bits of the address. As a result, the structure of responsible region determining portion 12 can be simple, and the determination can be performed rapidly. The processing for continuously arranging the regions, which are frequently accessed by a certain processor, on shared memory 4, is performed by software for determining addresses of variables such as an operating system or a programmer.

In this embodiment, as described above, cache line 18 in a responsible region of a certain processor is immediately updated when another processor performs writing for the corresponding copy. This improves the hit rate of cache line 18 in the responsible region, which will be probably accessed. When data 15 is written into a certain copy while cache line 18 (copy) is shared by the plurality of cache devices, this copy (cache line 18) is validated only for the processor having the responsible region having the copy, into which data 15 is written, and is invalidated ("I") for the other processors. As described above, cache line 18 (copy), which is not included in the responsible region, and is less likely to be accessed thereafter, is invalidated so that the sharing rate of the data can be lowered. Accordingly, it is possible to prevent conventional wasteful communication, which is performed via shared bus 2, and may be caused in False Sharing and a ping-pong effect, and a power consumption relating to shared bus 2 can be reduced.

(Second Embodiment)

In the first embodiment, responsible regions 10A, 10B, 10C and 10D are formed in the continuous address spaces in shared memory 4, respectively. However, these may be arranged as shown in FIG. 13.

Figure 13:
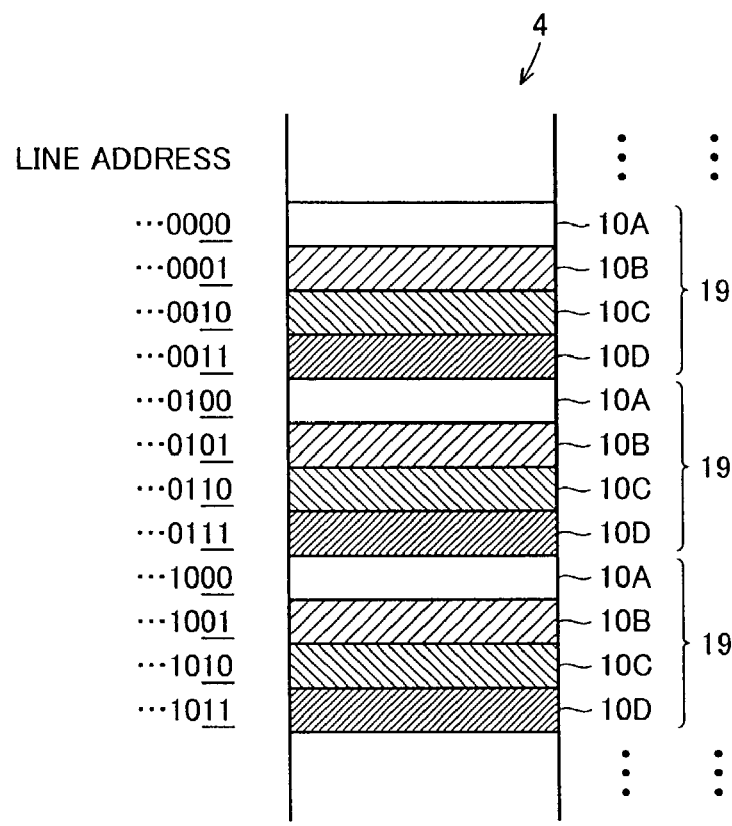
FIG. 13 shows responsible regions arranged for respective lines according to a second embodiment.

In FIG. 13, a plurality of groups 19 each including memory lines are continuously arranged in shared memory. Each group 19 includes the memory lines of responsible regions 10A, 10B, 10C and 10D arranged successively in a leading and subsequent positions, respectively. In the structure including the arrangement of responsible regions shown in FIG. 13, when the processor issues an access request for a certain address, responsible region determining portion 12 can determine from lower two bits of the address whether the address belongs to its own responsible region, or which one of the responsible regions is related to the address. As a result, the circuit structure of responsible region determining portion 12 can be simple and small in size. More specifically, it is determined that the responsible region belonging to the access-requested address is 10A when the lower two bits are "00" as shown in FIG. 13. Also, it is responsible region 10B in the case of "01". It is responsible region 10C in the case of "10", and it is responsible region 10D in the case of "11".

(Third Embodiment)

Figure 14:
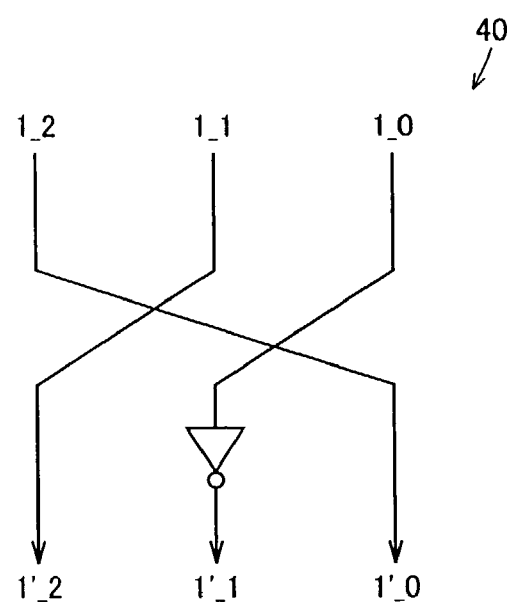
FIG. 14 shows an address converting circuit according to a third embodiment.
Figure 15:
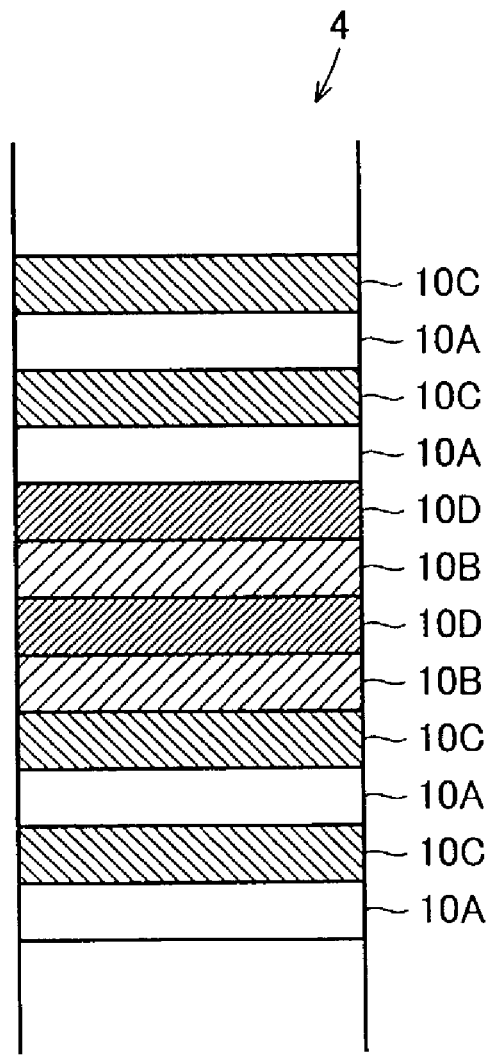
FIG. 15 shows an arrangement of responsible regions for converted addresses according to the third embodiment.

Responsible region determining portion 12 may have an address converting circuit 40 shown in FIG. 14. In this embodiment, responsible regions 10A, 10B, 10C and 10D are arranged at addresses (regions) in shared memory 4, and particularly at addresses, which are converted and determined by address converting circuit 40 shown in FIG. 14. In FIG. 14, bits 1_2, 1_1 and 1_0 represent lower three bits of the address, which is not yet converted by address converting circuit 40. Bits 1'_2, 1'_1 and 1'_0 represent lower three bits of the address, which is converted by and output from address converting circuit 40. When the processor outputs an access request for a certain address, the specific processor having the responsible region, to which the access-requested address belongs, is determined using lower two bits of the address converted by address converting circuit 40 shown in FIG. 14. FIG. 15 shows an example of an arrangement of responsible regions 10A, 10B, 10C and 10D in shared memory 4 of the structure using address converting circuit 40 shown in FIG. 14.

(Fourth Embodiment)

In a fourth embodiment, when the processor issues an access request for a certain address, determination whether the address belongs to the responsible region or not is made based on values stored in a plurality of registers 32 of a main memory device 31, which will be described later. It is assumed that these registers 32 in this embodiment have already stored predetermined values, respectively.

Figure 16:
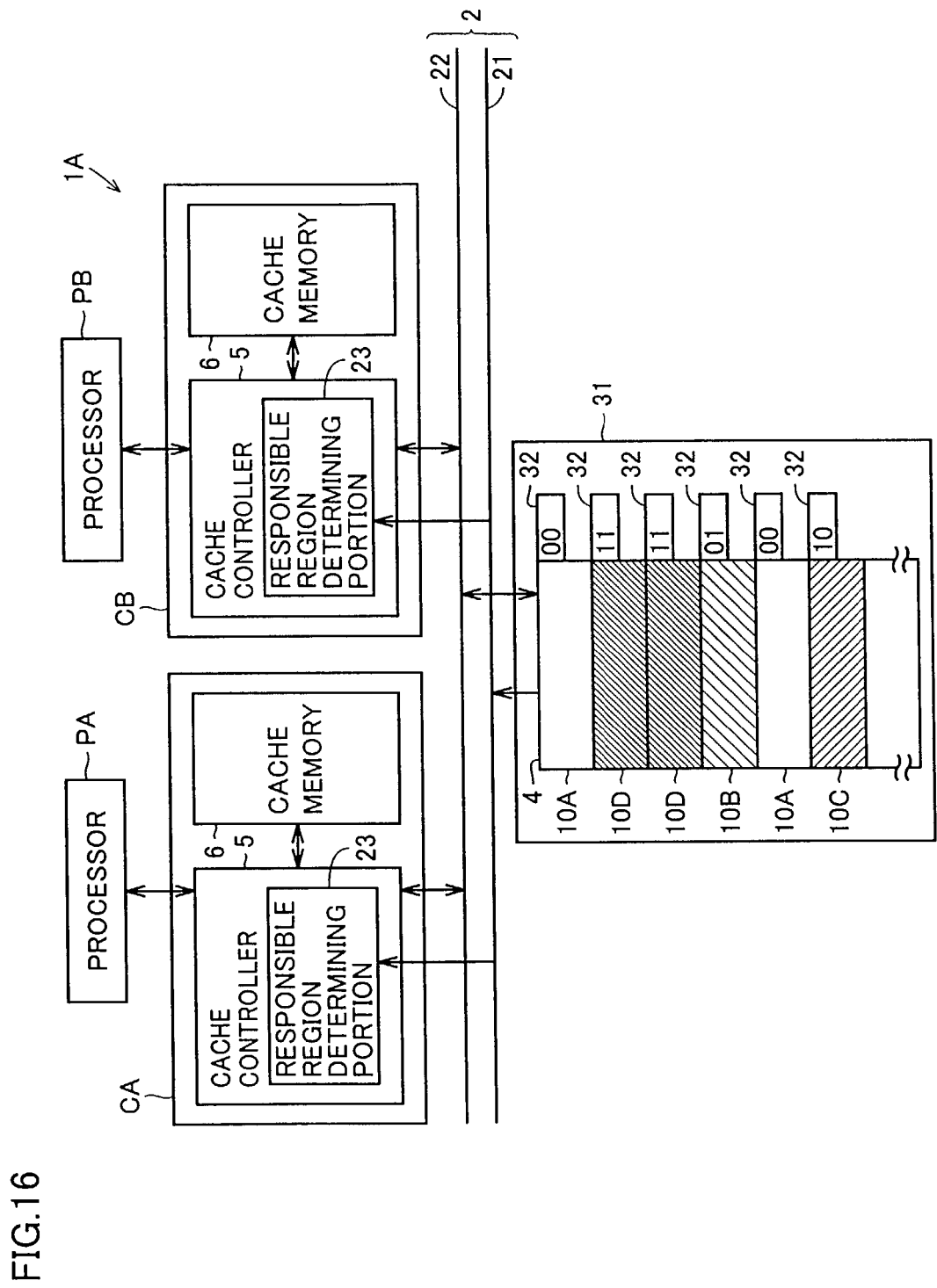
FIG. 16 shows a structure of a multiprocessor system according to a fourth embodiment.

FIG. 16 shows a structure of a multiprocessor system 1A according to the fourth embodiment. Multiprocessor system 1A differs from multiprocessor system 1 in that main memory device 31 is employed instead of main memory device 3. In FIG. 16, processors PC and PD as well as cache devices CC and CD are not shown, but cache devices CC and CD have substantially the same structures as cache devices CA and CB shown in FIG. 16. Cache devices CA and CB in FIG. 16 have substantially the same structure. Cache device CA (CB) has substantially the same structure as those already described except for that cache controller 5 has a responsible region determining portion 23 instead of responsible region determining portion 12. Main memory device 31 is provided with registers 32 each corresponding to one page of shared memory 4. If a value of register 32 is "00", corresponding page is responsible region 10A. Likewise, if the value is "01", it is responsible region 10B. If the value is "10", it is responsible region 10C. If the value is "11", it is responsible region 10D.

In FIG. 16, cache controller 5 is connected to other cache devices and main memory device 31 via the inter-cache communication line and system bus 22. Cache control managing portion 8 of cache control 5 receives an access request for an address in shared memory 4 from corresponding processor, and refers to shared memory 4 based on this address. At the time of this referring operation, contents of register 32 corresponding to this address are read and applied to responsible region determining portion 23 via system bus 21. Response region determining portion 23 stores the applied contents in an internal memory (not shown) such that the stored contents may be divided into portions corresponding to pages of shared memory 4, respectively. Therefore, responsible region determining portion 23 can determine, based on the stored contents of the internal memory, whether the access-requested address belongs to the responsible region of the corresponding processor, or of which responsible region relates to the address.

In this embodiment, since register 32 is provided for each page in shared memory 4, the responsible regions of each processor can be arranged in shared memory 4 on the page-by-page basis. In other words, the structure is not restricted by such conditions that the responsible regions of each processor must be continuous to each other, and in other words, that the responsible regions of each processor must be arranged in a predetermined order. This improves the flexibility in design of software to be executed in multiprocessor system 1A.

In the above structure, register 32 is employed for each page. However, register 32 may be employed for each memory line of shared memory 4 or each address.

(Fifth Embodiment)

In contrast to the fourth embodiment, in which contents of register 32 are predetermined and fixed, the contents of register 32 are variable in this fifth embodiment.

In this embodiment, processing is performed to detect the processor, which accessed most times the page (memory line, address) corresponding to register 32 during execution of the program by multiprocessor system 1, and the value of register 32 is updated to a value representing the responsible region of the detected processor.

Figure 17:
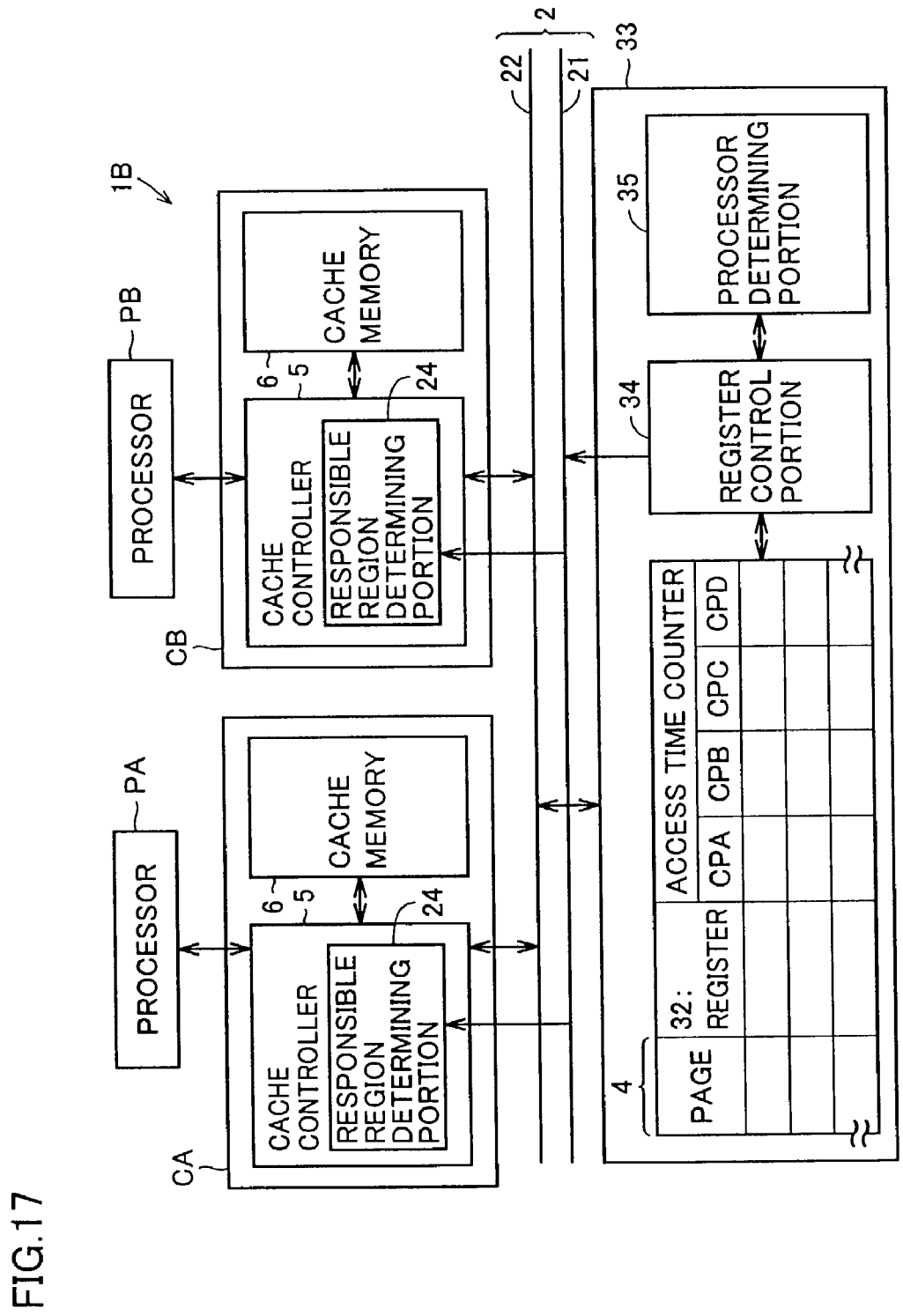
FIG. 17 shows a structure of a multiprocessor system according to a fifth embodiment.

In FIG. 17 showing a multiprocessor system 1B according to the fifth embodiment, processors PC and PD as well as cache devices CC and CD are not shown, but cache devices CC and CD have substantially the same structures as cache devices CA and CB in FIG. 17. Multiprocessor system 1B has a main memory device 33 instead of main memory device 3.

Cache device CA (CB) has substantially the same structure as that already described except for that a responsible region determining portion 24 is employed instead of responsible region determining portion 12 in FIG. 1. Each cache device can perform communication with other cache devices and main memory device 33 via the inter-cache communication line and system bus 22.

Main memory device 33 shown in FIG. 17 includes shared memory 4 as well as register 32 and access time counters CPA, CPB, CPC and CPD, which are provided for each page of shared memory 4. Main memory device 33 further includes a register control portion 34 and a processor determining portion 35. Access time counters CPA, CPB, CPC and CPD are provided corresponding to processors PA, PB, PC and PD, respectively. Access time counters CPA, CPB, CPC and CPD have substantially the same structure. When a page is accessed, a count is incremented only in the access time counter corresponding to the processor, which is determined as the access requester based on the access request. Among access time counters CPA, CPB, CPC and CPD corresponding to a certain page, the count takes the largest value in the counter corresponding to the processor, which have accessed most times this page.

Register control portion 34 cyclically or periodically updates the value of register 32 for each page of shared memory 4. More specifically, when a value of register 32 for each page is to be updated, register control portion 34 reads out each of values of access time counters CPA, CPB, CPC and CPD corresponding to this page, and applies it to processor determining portion 35. Therefore, processor determining portion 35 determines, based on these read values, the processor corresponding to the access time counter of the largest value, and applies results of this determination to register control portion 34. Based on the applied results of determination, register control portion 34 updates the contents of register 32 corresponding to the page in question. As a result, the value of register 32 represents that the responsible region belongs to the processor accessing the corresponding page most times.

Updating of the value by register control portion 34 of register 32 is performed exclusively with respect to the access to the corresponding page, i.e., the referring to register 32.

In this embodiment, register 32 and access time counters CPA, CPB, CPC and CPD are provided for each page of shared memory 4, but may be provided for each memory line or each address unit.

In this embodiment, since the value of register 32 is dynamically updated as described above, the protocol (state transition) of cache line 18 can be dynamically changed. By dynamically updating the value of register 32, it is possible to assign or allocate the responsible region in accordance with the contents of processing (program) to be executed by multiprocessor system 1B. Thereby, each processor concentratedly executes the processing using the data in its own responsible region, and sharing of the data is avoided. Accordingly, occurrence of False Sharing can be suppressed, and data transfer via sharing bus 2 can be avoided. As a result, multiprocessor system 1B can rapidly execute the processing.

(Sixth Embodiment)

In a sixth embodiment, values may be written into registers 32 described above as a result of execution of programs by processors PA, PB, PC and PD in multiprocessor system 1A. More specifically, information relating to the responsible region corresponding to each processor may be declared in the above program, whereby a value is written into each register 32 based on the declarative information during execution of the program. Writing of the value into register 32 is performed exclusively to referring to register 32, similarly to the foregoing embodiment.

As described above, by declaring the information relating to each responsible region in the program, it is possible to ensure in advance the responsible region to be optimum for the contents of the program. Therefore, processing according to the program can be executed rapidly and efficiently.

(Seventh Embodiment)

Figure 18:
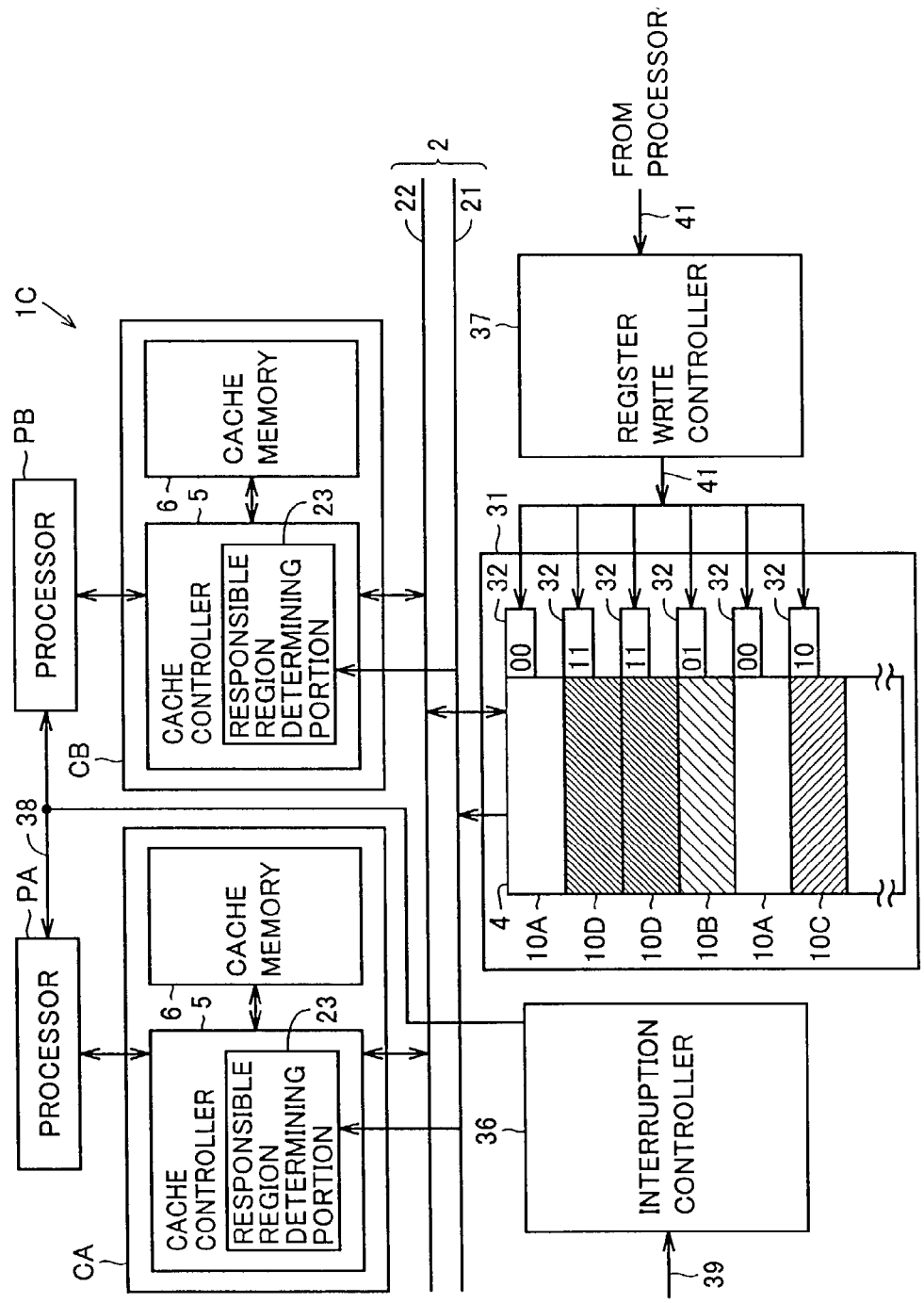
FIG. 18 shows a structure of a multiprocessor system according to a seventh embodiment.

When a certain processor refers to a certain address in shared memory 4, a multiprocessor system 1C of a seventh embodiment shown in FIG. 18 determines, based on the value of register 32 provided for each page, whether the address belongs to its own responsible region or not, similarly to multiprocessor system 1A already described.

In addition to the structures of multiprocessor system 1A, multiprocessor system 1C in FIG. 18 includes an interruption controller 36, a register write controller 37 and an interruption control line 38 for connecting interruption controller 36 to each processor. When interruption controller 36 receives an interruption signal 39 applied thereto, it applies received interruption signal 39 to one of the processors via interruption control line 38. Interruption signal 39 is applied to interruption controller 36 from a portion outside a chip carrying multiprocessor system 1C, from a peripheral circuit (not shown) or from the processor (software processing).

During the operation, the processor, which receives interruption signal 39 via interruption control line 38, interrupts current processing, and jumps to interrupt processing. This interruption processing is performed for writing a value into arbitrary register 32 in main memory device 31. When processor executes the interrupt processing, it determines a value to be written into arbitrary register 32, and applies register data 41 representing the determined value to register write controller 37. Register write controller 37 receives and writes register data 41 into the arbitrary register 32. The writing of value into register 32 is performed exclusively to the referring to register 32, similarly to the embodiments already described.

(Eighth Embodiment)

According to the operation of the first embodiment shown in FIG. 12, when data 15 is written into cache line 18 including state tag 16 of "SN", only the copy of state tag 16 of "SO" is validated, and state tags 16 of other copies are set to "I" so that sharing of the data may be avoided. However, the following manner may be employed. In the case of using a variable, which is likely to be rewritten by two or more processors, when data 15 is written into cache line 18 (copy) of the variable including state tag 16 of "SN", data 15 of other copies (cache lines 18) including state tags 16 of "SO" or "SN" are updated similarly via shared bus 2.

The state transition described above allows easy execution of the processing using the variable, which is likely to be rewritten by the plurality of processors.

(Ninth Embodiment)

A ninth embodiment differs from the embodiments already described in that each cache device transfers a cache line from corresponding cache memory 6 to shared memory 4 by write through. This ensures that contents of cache memory 6 are always the same as those of shared memory 4.

(Tenth Embodiment)

Figure 19:
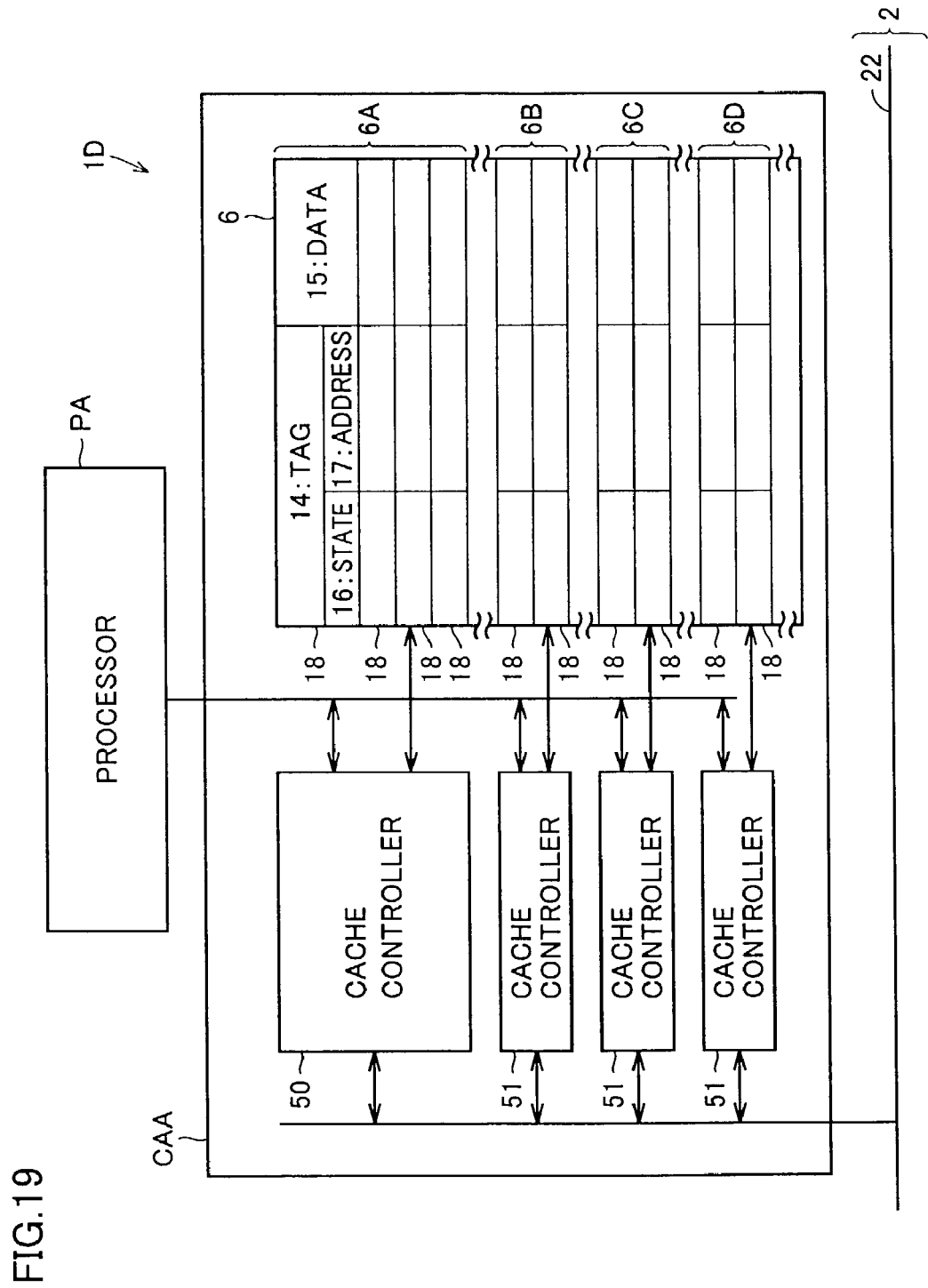
FIG. 19 shows a structure of a cache device according to a tenth embodiment.
Figure 20:
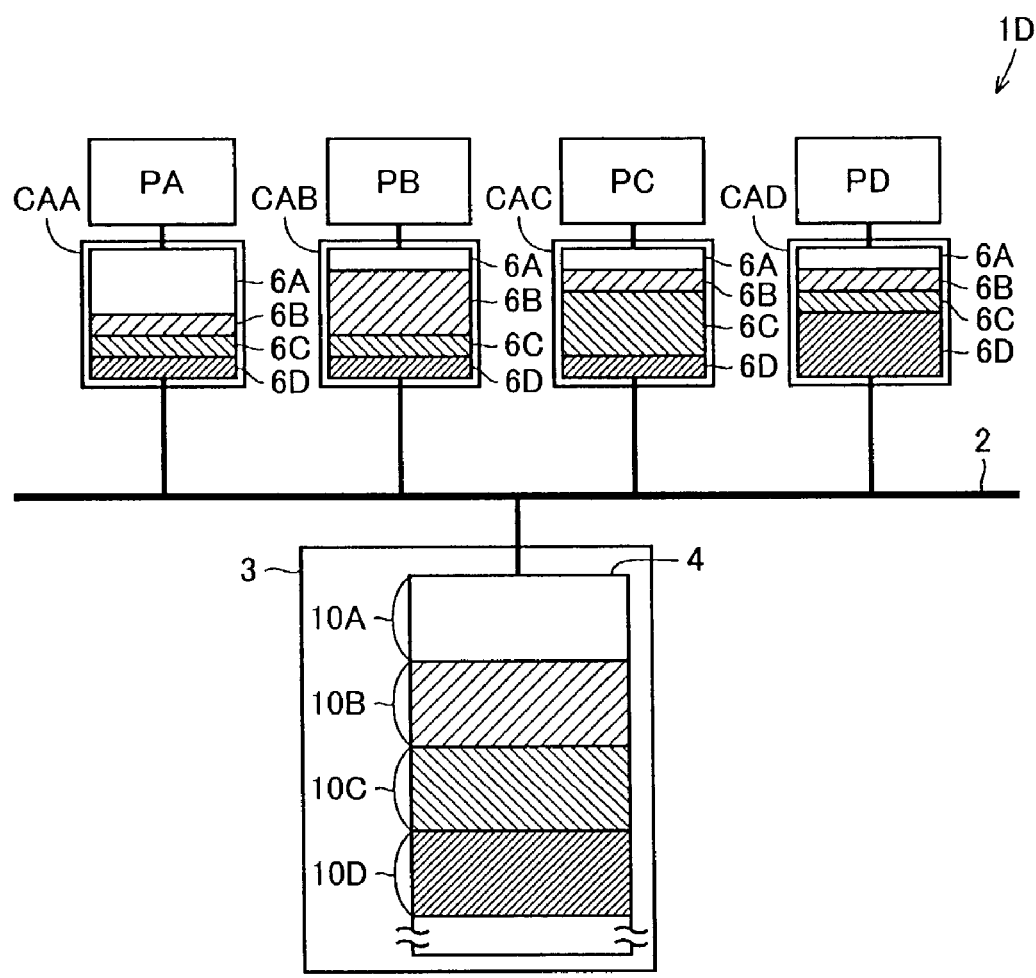
FIG. 20 shows a structure of a multiprocessor system according to the tenth embodiment.

A cache device in a tenth embodiment has a structure shown in FIG. 19. FIG. 20 shows a schematic structure of multiprocessor system 1D according to this embodiment. Multiprocessor system 1D in FIG. 20 has substantially the same structures as multiprocessor system 1A except for that cache devices CAA, CAB, CAC and CAD are employed instead of cache devices CA, CB, CC and CD. Since cache devices CAA, CAB, CAC and CAD have the same structure, cache device CAA will now be described by way of example.

Cache device CAA shown in FIG. 19 includes cache memory 6, a cache controller 50 and three cache controllers 51. Cache memory 6 includes a cache region 6A dedicated to responsible region 10A, and also includes cache regions 6B, 6C and 6D, which are similarly dedicated to responsible regions 10B, 10C and 10D, respectively. Cache controller 50 is provided for cache region 6A, and cache controllers 51 are provided for cache regions 6B, 6C and 6D, respectively.

Figure 21:
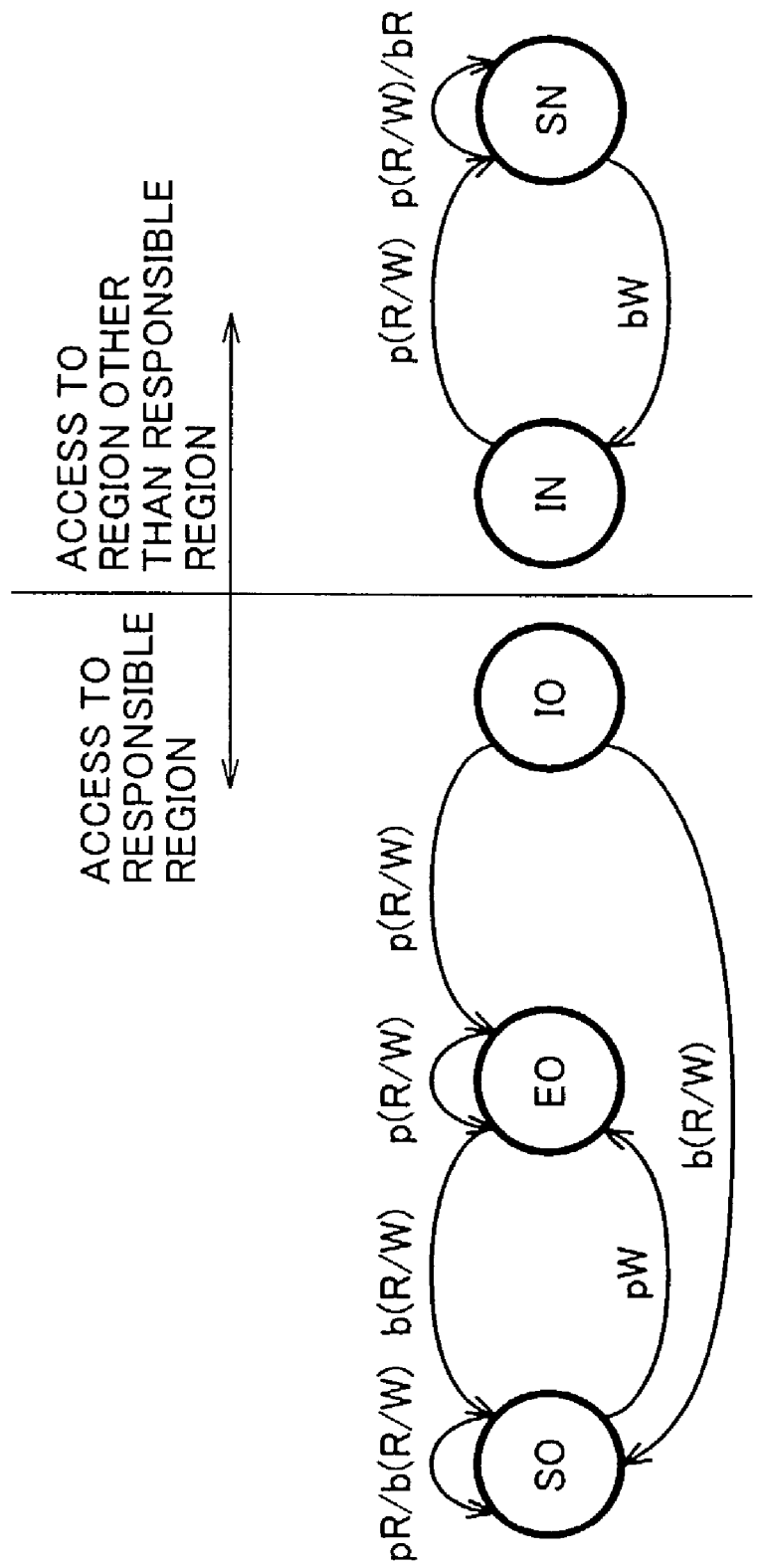
FIG. 21 is a state transition diagram of a cache consistency protocol according to the tenth embodiment.

In this case, the cache region to be used for storing cache line 18 is determined for the responsible region of each processor, and determination whether it is within responsible region or not is made for each cache line 18 so that the state transition in FIG. 1 changes as shown in FIG. 21 according to the above determination. According to the state transition shown in FIG. 21, the hit rate of cache memory can be improved, and the sharing rate of data can be reduced, similarly to the foregoing cases. A state "IO" in FIG. 21 represents that it is invalid (I) and an owner. A state "IN" represents that it is invalid (I) and not an owner.

In cache device CAA shown in FIG. 19, all cache lines 18 in cache region 6A change their states in accordance with a protocol of "access to responsible region" on the left side in FIG. 21, and all cache lines 18 in each of other cache regions 6B, 6C and 6D change their states in accordance with a protocol of "access to region other than responsible region" on the right side in FIG. 21. The other cache devices operate similarly. Therefore, cache controller 50 is required to have only a circuit structure, which can achieve the state transition of "access to responsible region" on the left side in FIG. 21, and thus can have a simpler structure than cache controller 5. Further, cache controller 51 can have a simpler circuit structure for achieving the state transition of "access to region other than responsible region" on the right side in FIG. 21.

Although access processing in each cache memory 6 is concentrated on the data in the responsible region of the corresponding processor, cache controller 50 of each cache device can concentratedly control the responsible region of the corresponding processor. Therefore, each cache device can improve the hit rate for cache memory 6, and can rapidly perform the control lowering the data sharing rate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cache device comprising at least first and second cache controllers each for controlling respective first and second cache memories, said first and second cache memories each provided to respective first and second processors sharing a shared memory with each other, said first and second cache controllers each connected to the shared memory via a bus, said first and second cache memories each comprising a plurality of data regions for temporarily storing information including data read from said shared memory by designating an address and said address designated, wherein said shared memory includes a first space to which at least one predetermined address space of said first processor is pre-assigned and which is for storing data to be accessed most frequently by said first processor, and a second space to which at least one predetermined address space of said second processor is pre-assigned and which is for storing data to be accessed most frequently by said second processor;

said first and second cache controllers perform mutual input and output via said bus;

when said first cache controller detects that data designated by an address belonging to said predetermined address space of said first processor in said first cache memory is updated, said first cache controller outputs an invalidation request including said address for designating data corresponding to said updated data to said second cache controller via said bus if said data corresponding to said updated data is stored in said second cache memory; and when said second cache controller receives said invalidation request from said first cache controller via said bus, said second cache controller invalidates said data corresponding to said updated data in said second cache memory based on said address in said received invalidation request.

2. The cache device according to claim 1, wherein when said second cache controller detects that said second processor updated data designated by an address belonging to said predetermined address space of said first processor in said second cache memory, said second cache controller outputs an update request including said updated data and said address via said bus; and when said first cache controller receives said update request, said first cache controller updates the data corresponding to said updated data based on said address in said received update request if it is detected that said address of said received update request belongs to said predetermined address space of said first processor.

3. The cache device according to claim 1, wherein when a plurality of predetermined address spaces corresponding to said first processor are assigned to said first space and a plurality of predetermined address spaces corresponding to said second processor are assigned to said second space, said plurality of predetermined address spaces corresponding to said first processor and said plurality of predetermine address spaces corresponding to said second processor are continuous in said shared memory, respectively.

4. The cache device according to claim 1, wherein said first and second spaces are assigned in said shared memory in accordance with a predetermined rule.

5. The cache device according to claim 1, wherein data in said shared memory is updated in response to every updating of data in one of said first and second cache memories.

6. The cache device according to claim 1, wherein when said first processor refers to data in the first cache memory designated by an address belonging to said predetermined address space of said second processor, and contents in the data region corresponding to said referred data are invalid, the first cache controller outputs a copy request including the address for designating said referred data;

when said second cache controller receives said copy request via said bus and detects that said address of said received copy request corresponds to said predetermined address space of said second processor, the second cache controller reads out contents in the data region of said second cache memory storing said address of said received copy request and outputs results of the reading via said bus to said first cache controller outputting said copy request.

7. The cache device according to claim 6, wherein
when said results of reading indicate that said read contents are invalid, each of the first cache controller outputting said copy request and the second cache controller receiving said copy request reads out said data designated by the address of said copy request from said shared memory, and stores said read data in respective said first and second cache memories.

8. The cache device according to claim 1, wherein
said first and second cache controllers refer to a register provided corresponding to each of said first and second spaces in said shared memory, and
said register stores processor assignment information for representing the predetermined address space of said first processor corresponding to said first space and the predetermined address space of said second processor corresponding to said second space.

9. The cache device according to claim 8, wherein
said first and second cache controllers determine, based on results of reference to said register, whether said address belongs to said predetermined address space of said first and second processors, respectively.

10. The cache device according to claim 8, wherein
said register is provided corresponding to each page of said shared memory, and
each of said first and second spaces corresponds to each page of said shared memory.

11. The cache device according to claim 8, wherein
contents of said register are arbitrarily and variably determined.

12. The cache device according to claim 11, wherein
contents of said register are set by program processing in said first and second processors.

13. The cache device according to claim 11, wherein
contents of said register are, set based on contents of a result of counting of access to said predetermined address space corresponding said register for each of said first and second processors.

14. A cache device comprising at least first and second cache controllers each for controlling respective first and second cache memories, said first and second cache memories each provided to respective first and second processors sharing a shared memory with each other, said first and second cache controllers each connected to the shared memory via a bus, said first and second cache memories each comprising a plurality of data regions for temporarily storing information including data read from said shared memory by designating an address and said address designated, wherein
said shared memory includes a first space to which at least one predetermined address space of said first processor is pre-assigned and which is for storing data to be accessed most frequently by said first processor, and a second space to which at least one predetermined address space of said second processor is pre-assigned and which is for storing data to be accessed most frequently by said second processor;
said first and second cache controllers perform mutual input and output via said bus, said first cache controller has a first dedicated access portion for accessing one or more among said plurality of data regions of said first cache memory storing an address belonging to said predetermined address space for said first processor corresponding to said first cache memory and a first non-dedicated access portion for accessing one or more of the remaining data regions, and said second cache controller has a second dedicated access portion for accessing one or more among said plurality of data regions of said second cache memory storing an address belonging to said predetermined address space for said second processor corresponding to said second cache memory and a second non-dedicated access portion for accessing one or more of the remaining data regions;
when said first cache controller detects that data designated by an address belonging to the predetermined address space of said first processor provided with said first cache memory is updated, said first dedicated access portion of said first cache controller outputs an invalidation request including said address for designating data corresponding to said updated data to said second cache controller via said bus if said data corresponding to said updated data is stored in said second cache memory, and
when said second non-dedicated access portion of said second cache controller receives said invalidation request from said first cache controller via said bus, said second non-dedicated access portion invalidates said data corresponding to said updated data in said second cache memory based on said address in said invalidation request received.

15. The cache device according to claim 14, wherein
when said second cache controller detects that said second processor has updated data of said remaining data region of said second cache memory, said second non-dedicated access portion outputs an update request including the updated data and an address of said updated data via said bus; and
when said first cache controller receives said update request, said first dedicated access portion updates the data corresponding to said updated data based on said address in said update request if it is detected that said address of said received update request belongs to the predetermined address space of said first processor.

* * * * *